US008979157B2

(12) United States Patent
Nelson

(10) Patent No.: US 8,979,157 B2
(45) Date of Patent: Mar. 17, 2015

(54) REMOVABLE ENCLOSURE FOR REAR OF VEHICLE

(71) Applicant: Charles R. Nelson, La Pointe, WI (US)

(72) Inventor: Charles R. Nelson, La Pointe, WI (US)

(*) Notice: Subject to any disclaimer, the term of this patent is extended or adjusted under 35 U.S.C. 154(b) by 0 days.

(21) Appl. No.: 14/302,094

(22) Filed: Jun. 11, 2014

(65) Prior Publication Data

US 2014/0291366 A1    Oct. 2, 2014

Related U.S. Application Data

(63) Continuation-in-part of application No. 13/075,052, filed on Mar. 29, 2011, now abandoned, and a continuation-in-part of application No. 12/662,687, filed on Apr. 28, 2010, now Pat. No. 8,317,251.

(Continued)

(51) Int. Cl.
*B60P 3/345*   (2006.01)
*E04H 15/06*   (2006.01)
*B60R 9/06*    (2006.01)
*B60P 3/40*    (2006.01)
*B60P 7/08*    (2006.01)
*B60R 5/04*    (2006.01)
*B62D 33/027*  (2006.01)

(52) U.S. Cl.
CPC . *B60R 9/065* (2013.01); *B60P 3/40* (2013.01); *B60P 7/0876* (2013.01); *B60R 5/041* (2013.01); *B62D 33/0273* (2013.01); *E04H 15/06* (2013.01)
USPC .............. 296/26.02; 296/26.08; 224/403; 135/88.13

(58) Field of Classification Search
USPC ............... 224/400, 402, 403, 404, 488, 539; 296/26.01, 26.02, 26.03, 26.08, 296/100.18; 135/88.05, 88.13, 88.15, 121, 135/138, 143, 125, 117, 87
See application file for complete search history.

(56) References Cited

U.S. PATENT DOCUMENTS

| 2,341,672 A | 2/1944 | Terrill |
| 2,442,132 A | 5/1948 | Laythe |
| 3,082,033 A | 3/1963 | Bosher |
| 3,383,127 A | 5/1968 | Grunfeld |

(Continued)

FOREIGN PATENT DOCUMENTS

| CA | 2 304 359 A1 | 10/2001 |
| FR | 2366775 A | 4/1978 |

(Continued)

OTHER PUBLICATIONS

U.S. Appl. No. 13/075,052, the priority of which is claimed.

*Primary Examiner* — Justin Larson
(74) *Attorney, Agent, or Firm* — Richard C. Litman

(57) ABSTRACT

The removable enclosure for the rear of a vehicle provides additional storage space or cover for the open rear end of a vehicle, such as an open tailgate of a pickup truck or the open hatch of an SUV. The removable enclosure includes a housing having at least one sidewall and an upper wall defining an open lower end and an open front end. An internal frame is disposed within and supports the housing. The internal frame includes at least one elastic cord extending laterally across the housing. A pair of laterally opposed diagonal supports each extend from an upper edge of the front end of the housing to a lower edge of a rear face of the at least one sidewall. The at least one elastic cord is secured to, and extends between, the pair of laterally opposed diagonal supports.

10 Claims, 24 Drawing Sheets

Related U.S. Application Data

(60) Provisional application No. 61/335,326, filed on Jan. 4, 2010, provisional application No. 61/283,237, filed on Nov. 30, 2009, provisional application No. 61/217,216, filed on May 27, 2009, provisional application No. 61/215,669, filed on May 8, 2009, provisional application No. 61/215,059, filed on May 1, 2009, provisional application No. 61/341,544, filed on Mar. 31, 2010, provisional application No. 61/342,805, filed on Apr. 19, 2010, provisional application No. 61/397,209, filed on Jun. 7, 2010, provisional application No. 61/489,183, filed on May 23, 2011.

(56) References Cited

U.S. PATENT DOCUMENTS

| | | |
|---|---|---|
| 3,417,764 A | 12/1968 | Hemenway |
| 4,088,363 A | 5/1978 | Palmer |
| 4,652,040 A | 3/1987 | Mahan |
| 4,716,918 A | 1/1988 | Hayashida et al. |
| 5,311,813 A | 5/1994 | Fairbanks et al. |
| 5,335,960 A | 8/1994 | Benignu, Jr. |
| 5,358,298 A | 10/1994 | Fate |
| 5,419,607 A | 5/1995 | Oliveira |
| 5,425,753 A | 6/1995 | Wege et al. |
| 5,582,197 A | 12/1996 | Dobberstein |
| D382,248 S | 8/1997 | Long |
| 5,676,414 A | 10/1997 | Hammond |
| 5,738,262 A | 4/1998 | Andrini |
| 5,806,906 A | 9/1998 | Hammond |
| 5,820,189 A | 10/1998 | Tew |
| 5,887,932 A | 3/1999 | Pier, II. |
| 6,155,279 A | 12/2000 | Humphrey |
| 6,394,118 B1 | 5/2002 | Cikanowick et al. |
| D461,759 S | 8/2002 | Napieraj |
| 6,481,784 B2 | 11/2002 | Cargill |
| 6,499,411 B2 | 12/2002 | Brown |
| 6,679,009 B2 | 1/2004 | Hotes |
| 6,725,807 B1 | 4/2004 | Tapia |
| 6,802,327 B2 | 10/2004 | Koss |
| 6,866,054 B1 | 3/2005 | Collins |
| 7,059,660 B1 | 6/2006 | Juola |
| 7,396,064 B2 | 7/2008 | Hicks |
| 7,568,491 B2 | 8/2009 | Banfill et al. |
| D624,486 S | 9/2010 | Shipp, Jr. |
| 7,789,097 B1 | 9/2010 | Sotirkys et al. |
| 2003/0029487 A1 | 2/2003 | Kight |
| 2003/0066550 A1 | 4/2003 | Al-Ghamdi |
| 2003/0106471 A1 | 6/2003 | Rivers |
| 2006/0060235 A1 | 3/2006 | Ball |

FOREIGN PATENT DOCUMENTS

| | | |
|---|---|---|
| FR | 2 409 883 | 6/1979 |
| GB | 2 393 155 A | 3/2004 |

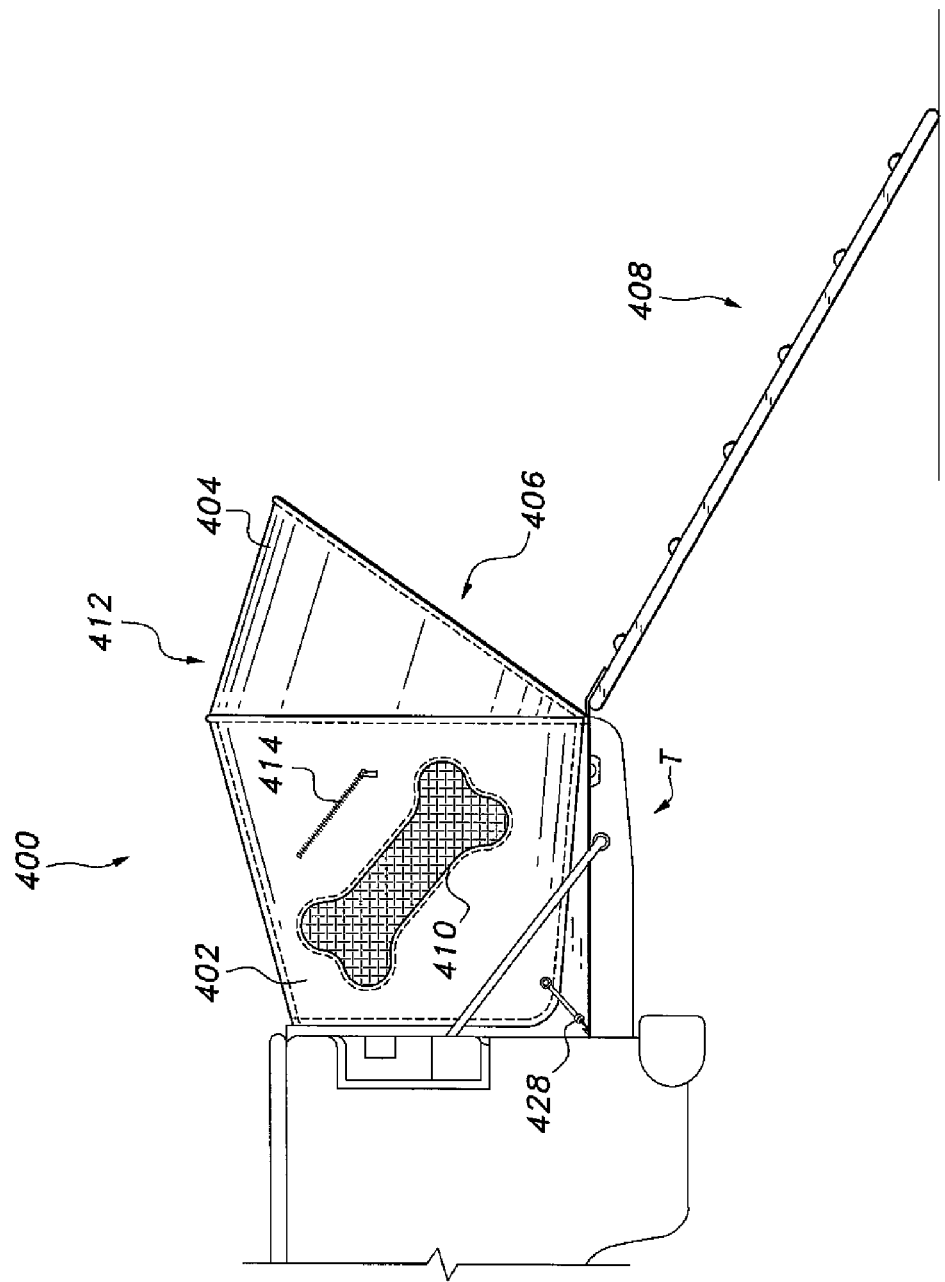

REMOVABLE ENCLOSURE FOR REAR OF VEHICLE

This application is a continuation-in-part U.S. Non-Provisional patent application Ser. No. 13/075,052, filed on filed on Mar. 29, 2011, now abandoned, which is a continuation-in-part of U.S. Non-Provisional patent application Ser. No. 12/662,687, filed on Apr. 28, 2010, and issued as U.S. Pat. No. 8,317,251 on Nov. 21, 2012, which claimed the benefit of U.S. Provisional Patent Application Ser. Nos. 61/335,326, filed on Jan. 4, 2010; 61/283,237, filed on Nov. 30, 2009; 61/217,216, filed on May 27, 2009; 61/215,669, filed on May 8, 2009; and 61/215,059, filed on May 1, 2009. This application also claims the benefit of U.S. Provisional Patent Application Ser. No. 61/341,544, filed Mar. 31, 2010; Ser. No. 61/342,805, filed Apr. 19, 2010; Ser. No. 61/397,209, filed Jun. 7, 2010; and Ser. No. 61/459,183, filed Dec. 7, 2010.

BACKGROUND OF THE INVENTION

1. Field of the Invention

The present invention relates to vehicle accessories and to portable enclosures, and particularly to a removable enclosure for the rear of a vehicle that provides additional storage space or cover for the open rear end of a vehicle, such as an open tailgate of a pickup truck, the open hatch of a sports utility vehicle or the like.

2. Description of the Related Art

Although enclosures for the bed of a pickup truck and the like are known, most such enclosures, particularly those adapted for providing temporary shelter while camping, are heavy rigid structures that are semi-permanently attached to the cargo box of the pickup truck. Thus, conversion between normal usage of the truck for transport of loads and the like and the shelter is inconvenient to the user. Such structures are also difficult to separately transport and store. Collapsible, rigid enclosures (i.e., so-called "pop-up" campers) have been provided that include rigid panels that fold into a relatively low profile for travel, and then unfold or pop up to form a camping enclosure. However, such rigid enclosures are extremely heavy, difficult to install on a pickup truck, difficult to remove from a pickup truck, and are relatively expensive.

There are numerous accessories that are especially adapted for use with a standard pickup truck, with the most common including bed liners, caps, tonneau covers, utility enclosures and camper bodies. The utility enclosure and the camper body involve structures that are intended to fit into the bed of the vehicle between the wheel wells, and provide access to the interior thereof via a door or doors at the rear end. The vehicle operator can enter the enclosure or camper body to obtain equipment or to eat or sleep as is necessary.

A camper body can be outfitted with all of the amenities of home, just like a travel trailer, although the interior is rather cramped and is best suited to one or two occupants at a time. A camper body is very heavy and a great deal of care must be exercised if one wants to remove the body from the bed of the truck so that the truck can be put to other uses. Similarly, a utility enclosure is quite heavy, and once it is inserted into the bed, it is likely that it will not be removed therefrom without there being a specific need to use the truck with its bed exposed. A utility enclosure is, in essence, a larger version of a truck cap, and it will usually be filled with tools and other equipment.

Soft enclosures, such as tents, that are mountable in the cargo box of a pickup truck have also been provided. Typically, these tents are limited in size to the length of the cargo box when the tailgate is in the vertical, or closed, position. Other tents have been provided that are partially attached to the cargo box and are partially attached to the ground. Such tents are quite complex and require a substantial amount of time and effort to erect. Moreover, these tents tend to become quite hot in direct sunlight and do not provide adequate shelter from rain and wind. Further, these tents do not provide adequate storage space.

There are numerous different types and styles of conventional campers. Examples of campers include the shell-style camper, which rests upon rear sidewalls of a pickup truck; the hard-walled camper which fits within the bed of a pickup truck; and flexible-walled camper systems, which utilize a tent or tent-like covering mounted upon a frame attached to the truck.

Conventional flexible wall camper units generally include a frame portion and a tent covering portion. The frame portion generally corresponds to a conventional tent frame, with tent pole members attached to the truck and generally oriented over the pickup truck bed. The tent covering may be of canvas, nylon, or similar material, and generally is spread over the tent frame to enclose the camper and truck bed.

Such conventional camper units are typically mounted in trucks, such as pickup trucks, which have a rear tailgate member that can be lowered to a position flush with the bed of the truck. Thus, the tailgate may be used to effectively extend the length of the bed beyond a rear bumper portion of the truck.

With conventional tent camper arrangements, there have been some problems with accommodating the tailgate. In some arrangements, the tailgate cannot be enclosed within the tent camper, so the ability of the tailgate to extend the length of the bed to make for more room is not utilized. In arrangements where the tailgate is enclosed within the tent, a complex frame system may be required and/or special attachment means mounted on the tailgate may be necessary in order to provide for secure engagement between the tent covering and the tailgate. Such systems may be relatively expensive, difficult to assemble or disassemble, may require special modifications to the truck, truck frame or body, and may be unattractive.

Another problem with such systems has been the general failure to provide an appropriate anchor point for securing the tent covering and frame. For a conventional tent mounted upon the ground, generally stakes and laterally extending lines, often referred to as guy-lines, are used to maintain tension on the frame of the tent, by placing tension on the tent covering or poles, to support the tent frame in an upright position and maintain same against strong winds or the like.

In conventional tent camper arrangements mounted upon truck beds, however, generally such guy-lines and stakes are undesired as they inhibit the ability to move the vehicle, even slightly, with the camper erected and, further, they prevent the camper unit from being used over hard surfaces, such as pavement, asphalt or firmly graded ground, where the driving of stakes would be difficult if not impossible. Generally, in the past, this has necessitated the development of complex frame systems, for use with such trucks, which are free standing in that they do not use guy-lines either attached directly to the frame or on the tent covering over the frame, for secure erection. Even conventional tent camper systems that have enclosed the tailgate therein have generally failed to utilize the tailgate as a laterally extended anchor point serving as a substitute for a guy-line and stake.

Devices that are secured to the rearward portion of motor vehicles for the purpose of recreational camping within the vehicles are known. However, such devices are typically difficult to transport and store, provide less than adequate protection from adverse weather conditions, are not easily installed on the vehicle, and require both modifications and additions to the vehicle. Additionally, such systems are not well adapted for multiple uses. For example, a tent designed for connection to a pickup truck typically is designed for single-person usage in a single environment, and could not be easily adapted to, for example, ice fishing or for providing protection for a dog. Additionally, such systems do not provide multiple functionality, being used for both storage and as an enclosure.

Thus, a removable enclosure for the rear of a vehicle solving the aforementioned problems is desired.

SUMMARY OF THE INVENTION

The removable enclosure for the rear of a vehicle provides additional storage space or cover for the open rear end of a vehicle, such as an open tailgate of a pickup truck, the open hatch of a sports utility vehicle or the like. The removable enclosure includes a housing having at least one sidewall and an upper wall, the housing having an open lower end and an open front end. Preferably, a flap is formed in the upper wall of the housing. The housing may be formed from any suitable type of waterproof material, such as that commonly used in the manufacture of tents, tarps and the like. At least one storage pocket is preferably formed on an inner face of the flap. Additionally, a slit may be formed through the at least one sidewall of the housing. The flap and slit may be releasably sealed by any suitable type of releasable fastener, such as zippers or the like.

An internal frame is disposed within and supports the housing. The internal frame includes at least one elastic cord extending laterally across the housing, the cord being secured to an inner surface thereof. A pair of laterally opposed diagonal supports each extend from an upper edge of the front end of the housing to a lower edge of a rear face of the housing. The elastic cord is secured to and extends between the pair of laterally opposed diagonal supports.

A laterally extending resilient member, which is formed from foam or the like, may be mounted on a front, upper portion of the internal frame. This allows the front, upper portion of the housing to be angled upwardly, the upper portion being substantially triangular. When applied to the open tailgate of a pickup truck, the housing may be used with the cover of the pickup truck's bed in place, the front end of the housing being disposed between the laterally opposed walls defining the bed and the upper edge of the triangular portion of the upper wall of the housing contacting a lower surface of the cover, and providing a seal therebetween.

Any suitable type of releasable fastener may be used to secure the open front end and the open lower end of the housing to the open rear end of the vehicle. For example, at least one pair of hook members may be respectively attached to laterally opposed ends of the elastic cord. The hook members engage a pair of brackets mounted within the rear end of the vehicle to releasably secure the housing to the rear end of the vehicle.

These and other features of the present invention will become readily apparent upon further review of the following specification and drawings.

BRIEF DESCRIPTION OF THE DRAWINGS

FIG. 12 is a side view of another alternative embodiment of a removable enclosure for the rear of a vehicle according to the present invention.

Similar reference characters denote corresponding features consistently throughout the attached drawings.

DETAILED DESCRIPTION OF THE PREFERRED EMBODIMENTS

Figure 1:
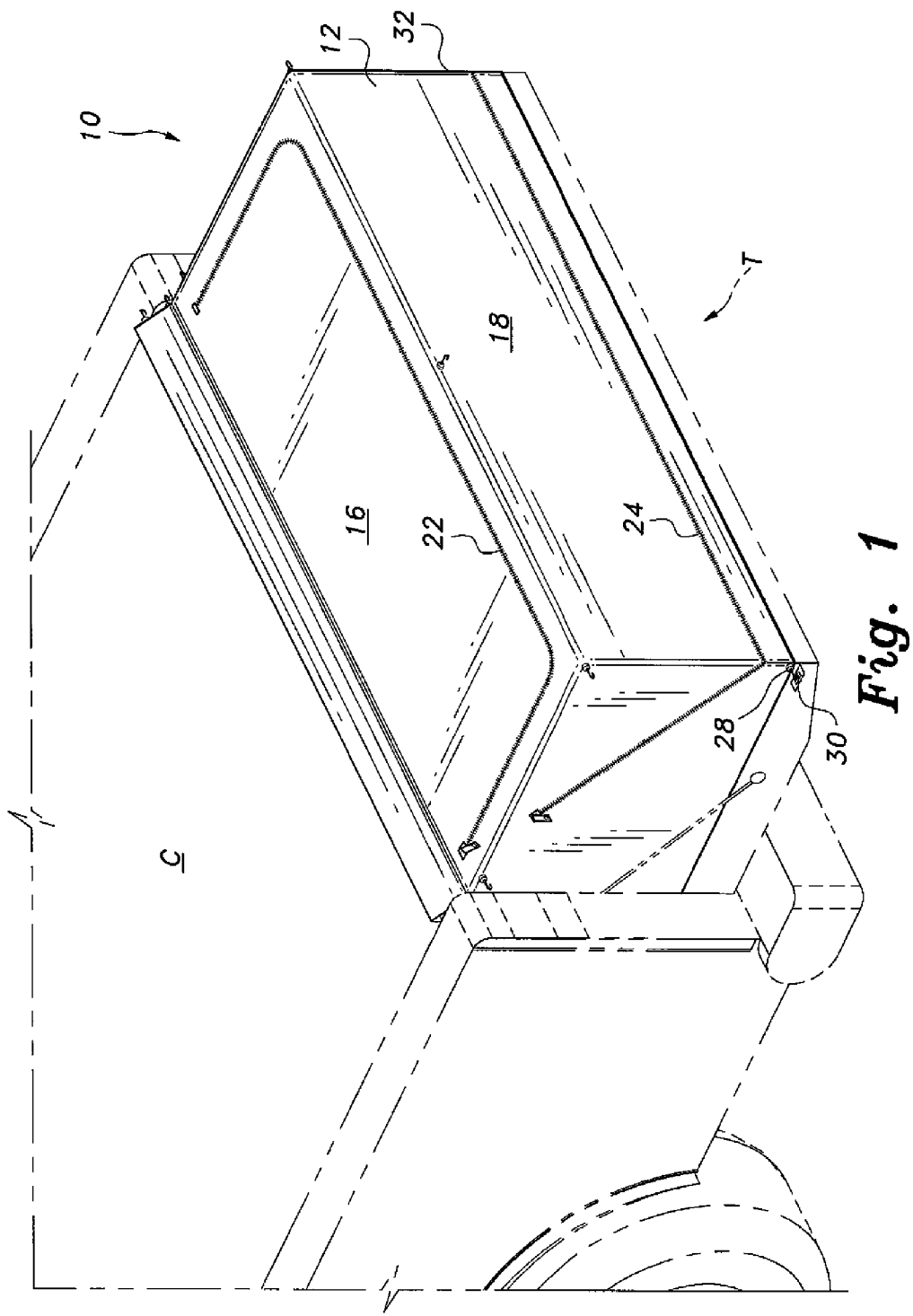
FIG. 1 is an environmental, perspective view of a first embodiment of a removable enclosure for the rear of a vehicle according to the present invention.
Figure 2:
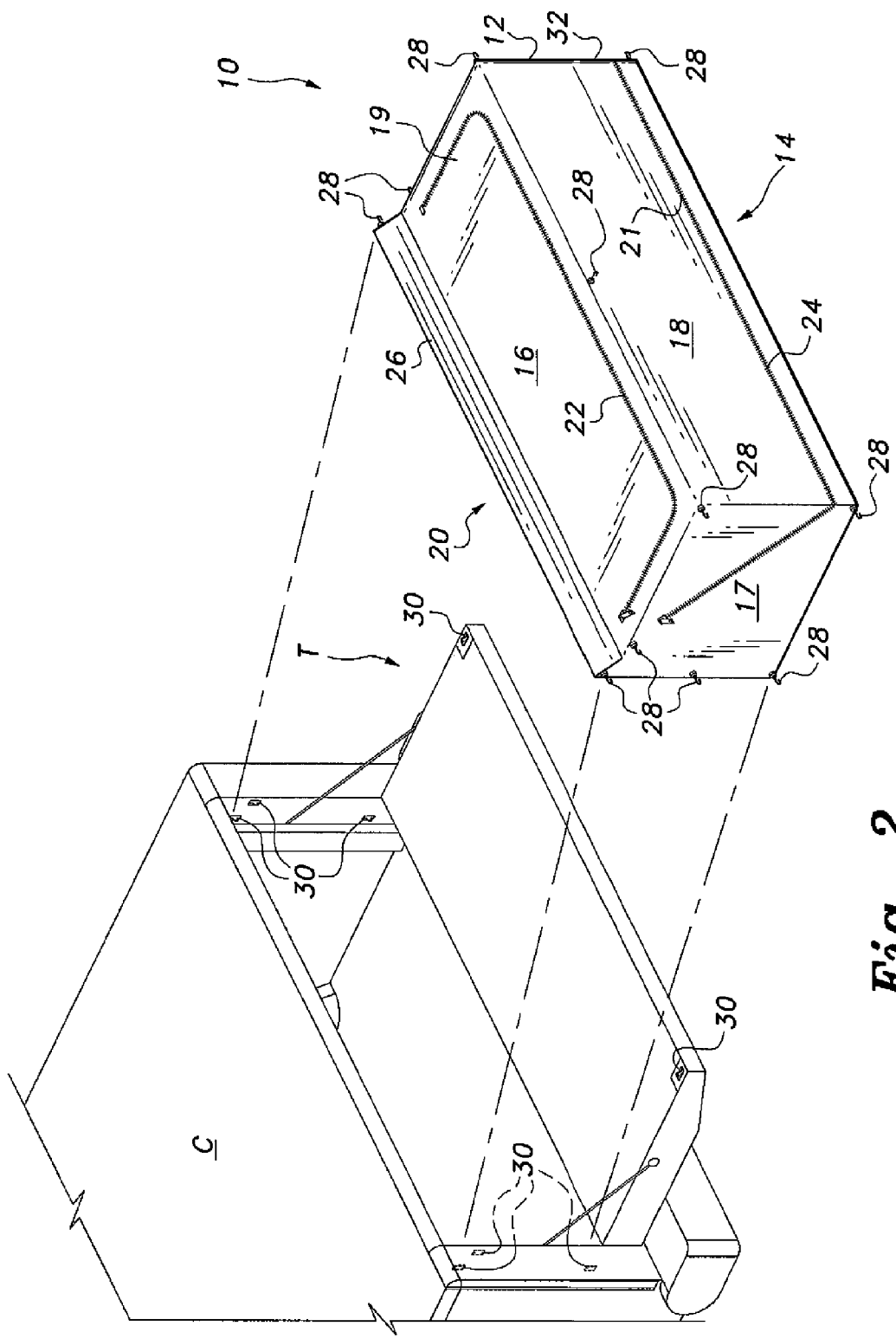
FIG. 2 is a perspective view of the removable enclosure of FIG. 1.

As best shown in FIGS. 1 and 2, in a first embodiment, the removable enclosure for the rear of a vehicle 10 provides additional storage space or cover for the open rear end of a vehicle, such as an open tailgate T of a pickup truck, the open hatch of a sports utility vehicle or the like. It should be understood that the tailgate T of the pickup truck shown in FIGS. 1 and 2 is shown for exemplary purposes only, and that the enclosure 10 may be applied to the open rear end of any suitable type of vehicle.

The removable enclosure 10 includes a housing having at least one sidewall 12 and an upper wall 16, the lower end and the front end 20 of the housing both being open. Hereinafter, the terms "front" and "rear" will refer to the orientation of enclosure 10 illustrated in FIGS. 1 and 2 in reference to the vehicle; i.e., the front end 20 of the housing 32 faces the open rear end of the vehicle and the rear face 18 of the housing faces away from the open rear end of the vehicle. In other words, the terms "rear" and "front" are used relative to the rear and front of the vehicle. In the example of FIGS. 1 and 2, the front end 20 of the housing extends into the body of the vehicle (i.e., into the truck bed, supported by the lowered tailgate T) by approximately ten inches.

Figure 6:
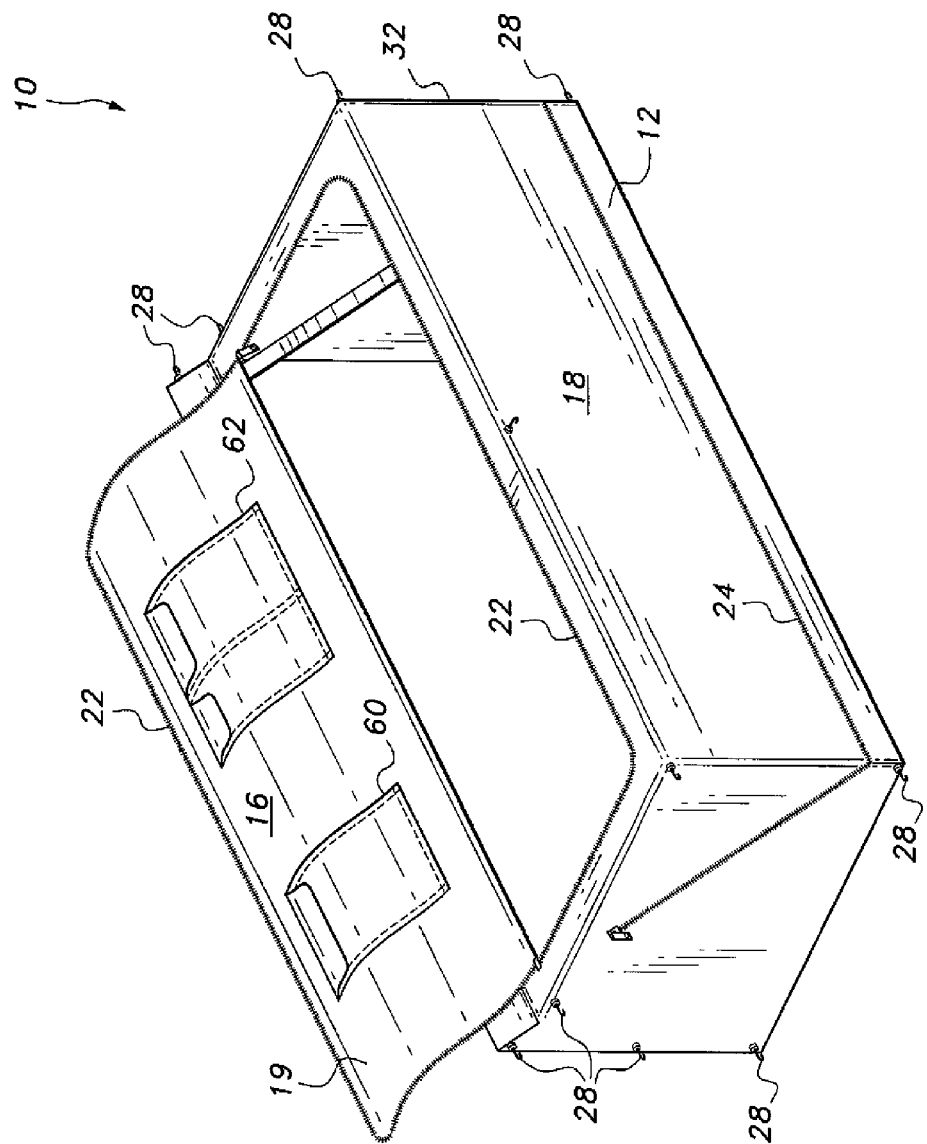
FIG. 6 is a perspective view of the removable enclosure of FIG. 1, shown in a partially opened configuration.

As shown, the housing preferably has a substantially rectangular cross sectional, with a pair of laterally opposed, substantially rectangular walls 17, and a substantially rectangular rear face 18 defining the open front end 20 and the open lower end, which are also preferably substantially rectangular. As best shown in FIGS. 2 and 6, a flap 19 is formed in the upper wall 16 of the housing. The housing may be formed from any suitable type of waterproof material, such as that commonly used in the manufacture of tents, tarps and the like. At least one storage pocket is disposed on the inner face of the flap 19. In the example of FIG. 6, a single storage pocket 60 and a double-chambered storage pocket 62 are shown fixed to the inner face of flap 19. It should be understood that the number, orientation, position, configuration, and dimensions of the pockets may be varied, depending upon the needs of the user. The pockets may be formed from mesh, canvas or the like, and may be particularly adapted for containing flashlights, batteries, or any other desired accessories.

Additionally, a slit 21 may be formed through the at least one sidewall 12 of the housing 32. As best shown in FIG. 2, the slit 21 may extend from the front, upper edges of the laterally opposed walls 17 to the rear, lower edges thereof, and extend laterally across the lower end of the rear face 18. The flap 19 and slit the 21 may be releasably sealed by any suitable type of releasable fastener, such as zippers 22, 24 or the like. Both the flap 19 and the slit 21 allow for easy loading and unloading of materials from the truck's bed when the enclosure 10 is in place.

Figure 3:
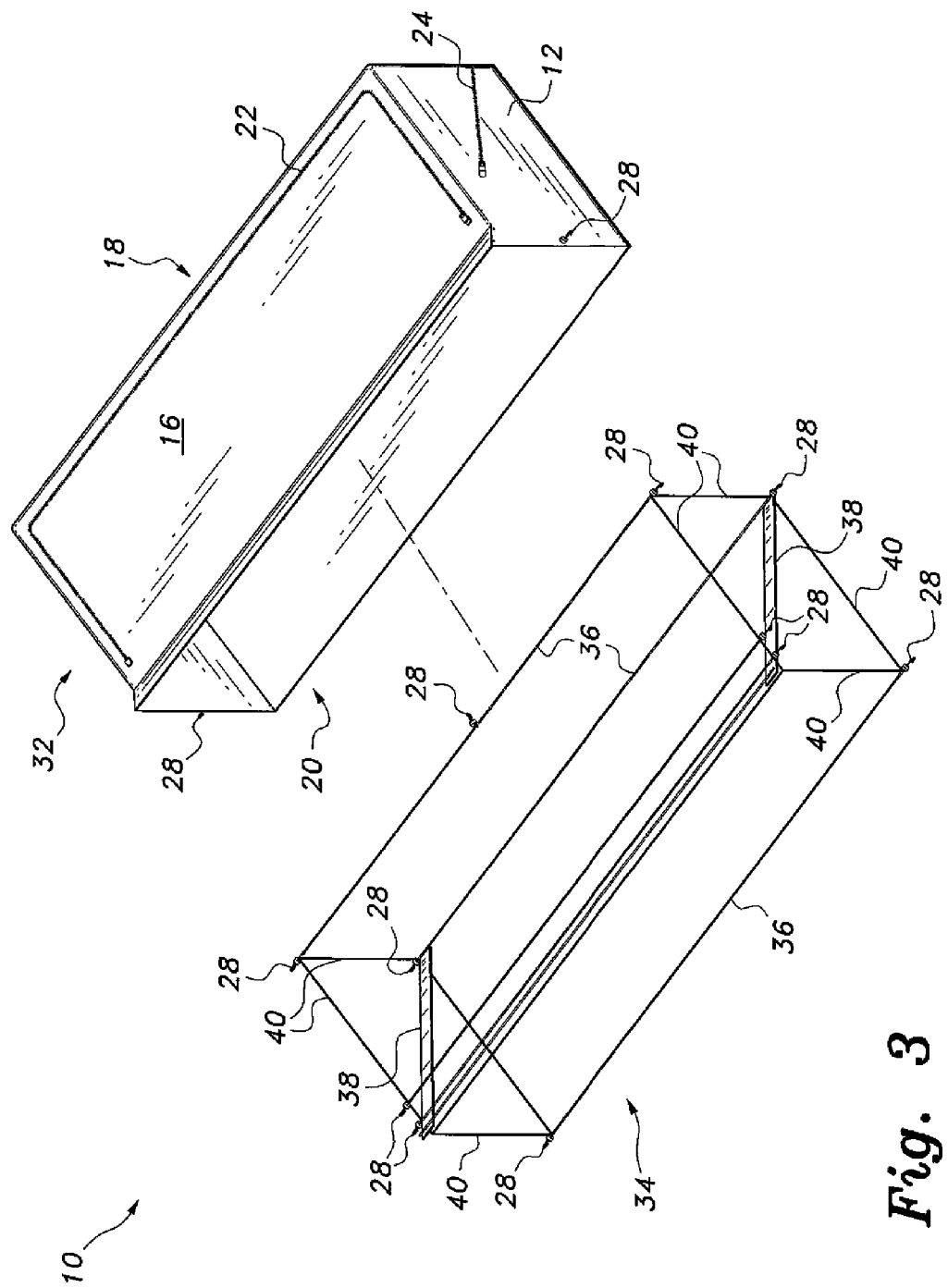
FIG. 3 is a partially exploded perspective view of the removable enclosure of FIG. 1.

As shown in FIG. 3, an internal frame is disposed within and supports the housing 32. The internal frame includes at least one elastic cord 36 extending laterally across the frame. As shown in FIG. 3, preferably, a plurality of elastic cords 36 are provided. A pair of laterally opposed diagonal supports 38 each extend from an upper edge of the front end of the frame to a lower edge of the rear of the frame. The elastic cords 36 extend between the pair of laterally opposed diagonal supports 38. Preferably, the diagonal supports 38 are formed from a firm, yet flexible, material. Additional side supports or rods 40 may also be added, allowing for the rectangular shape of the frame, as shown in FIG. 3. These additional supports allow the user to adjust the overall shape of the frame. For example, the upper, rearmost elastic cord 36, shown in FIG. 3, may be collapsed against the diagonal supports 38, allowing the overall configuration of the enclosure 10 to be changed from a substantially rectangular enclosure to a substantially triangular enclosure. Side supports 40 may be formed from fiberglass rods or the like, allowing them to be easily bent, yet provide strong support for the housing 32.

Figure 7:
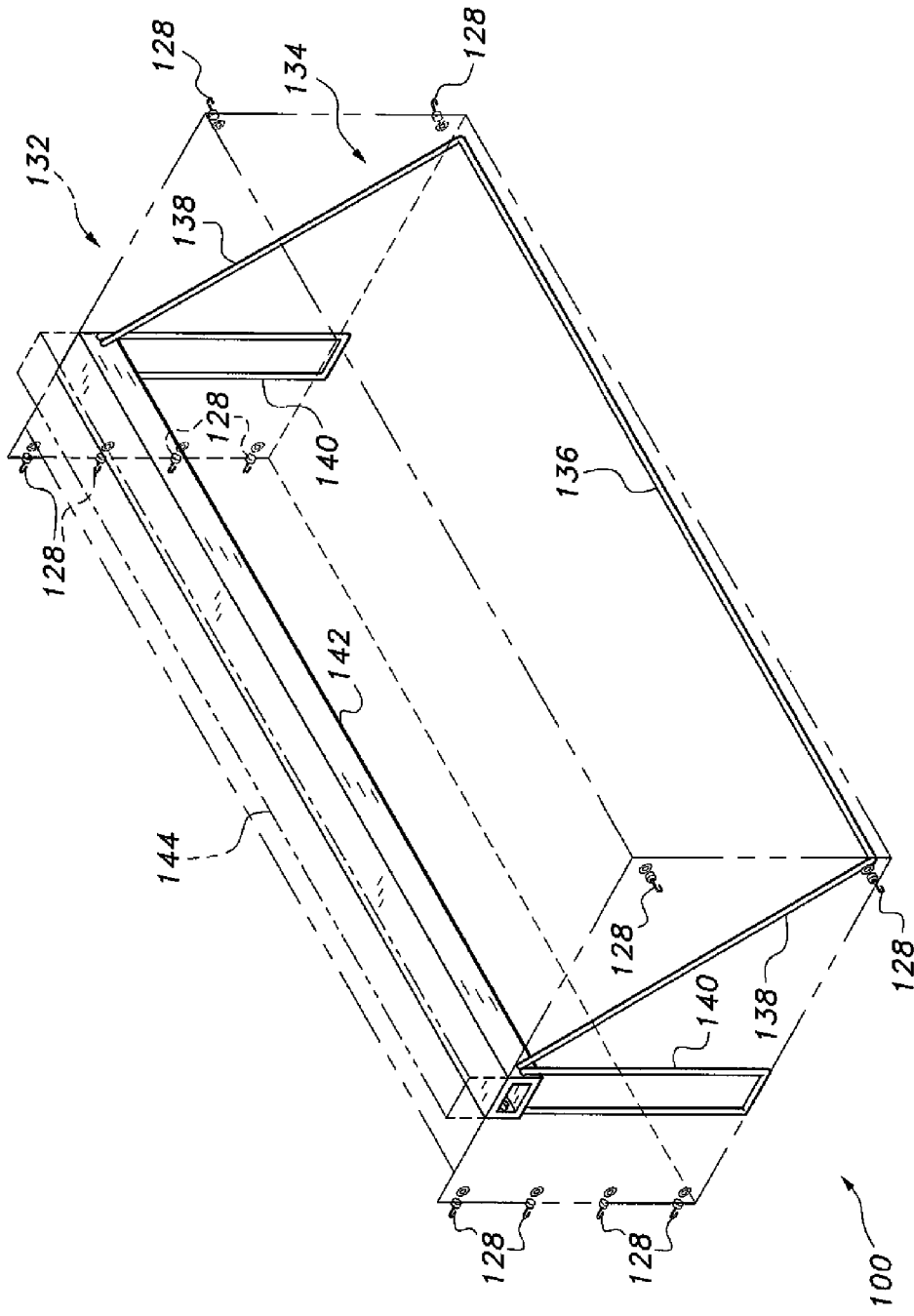
FIG. 7 is a perspective view of another alternative embodiment of a removable enclosure for the rear of a vehicle according to the present invention.

FIG. 7 illustrates a frame 134 of an alternative enclosure 100 for supporting a housing 132. Frame 134 includes a laterally extending upper frame member 142 and a pair of pivoting side frame members 140 projecting downwardly from either end. Pivoting side frame members 140 are pivotally secured at their upper ends to the upper frame member 142. Preferably, the side frame members 140 are received within sleeves or the like associated with cover 132. When the cover 132 is opened, the side frame members 140 may be swung into place as they are received within the sleeves. The diagonal supports 38 of the frame of FIG. 3 are replaced by rods 138, and at least one elastic cord 136 extends therebetween, as shown.

A laterally extending, resilient member 144, formed from foam or the like, may be mounted on the front, upper frame member 142. The pivoting side frame members 140 allow for easy collapse of the frame 134 (and of the entire enclosure 100) for storage or transport. Additionally, the upper frame member 142 may be centrally hinged, allowing for additional collapse of frame 134. Alternatively, upper frame member 142 may be telescoping, formed from two separate members, with one sliding within the other, thus allowing for selective reduction and control over the length of member 142.

Figure 14:
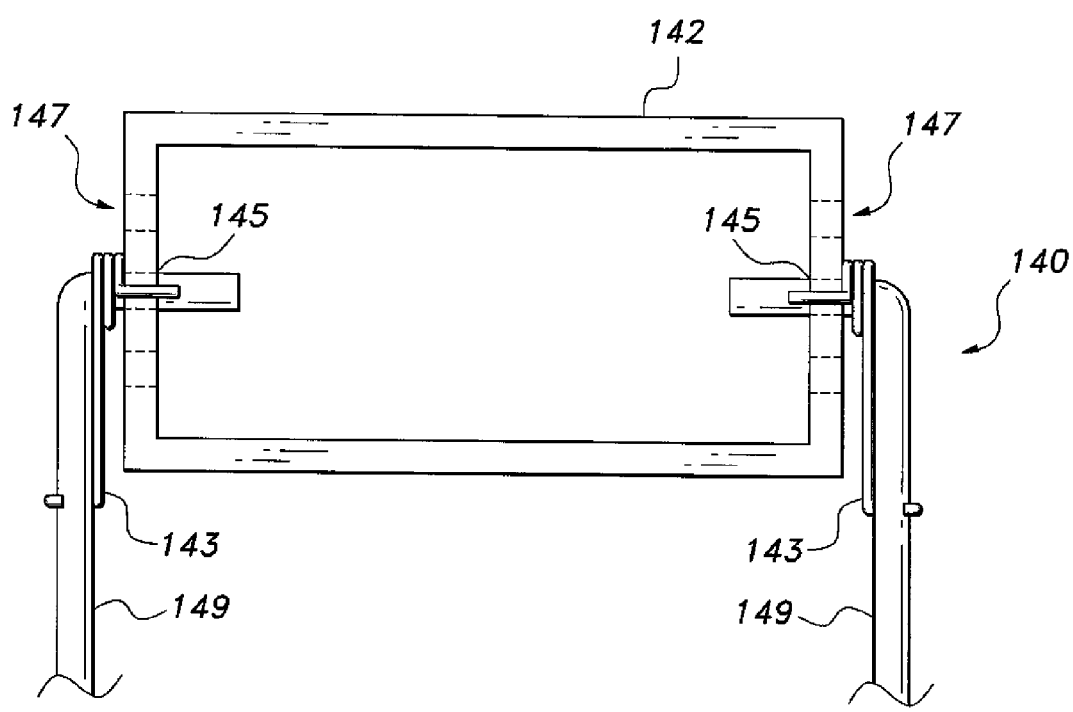
FIG. 14 is a partial side view of a portion of the frame for the removable enclosure of FIG. 7, showing details of the side frame members.

As best shown in FIG. 14, each side frame member 140 includes a pair of vertical struts 149 (forming the legs of the substantially U-shaped member 140). The upper ends of the struts 149 are inserted through opposed openings formed through the upper frame member 142. Preferably, at least two sets of openings 145, 147 are provided, allowing for vertical height adjustment of the side frame members 140 with respect to the upper frame member 142. As shown, the side frame members 140 may be spring-biased with respect to upper frame member 142 by helical torsion springs 143 or the like. The springs 143 bias the struts 149 downward at a 90° angle to the upper frame member 142, aiding in quick setup of the enclosure 100 and attachment to the truck.

A similar resilient member may also be mounted on the frame of FIG. 3. This allows a front, upper portion 26 (shown in FIG. 2) of the housing to be angled upwardly to form a substantially triangular shape. When applied to the open tailgate T of a pickup truck, the housing may be used with the cover C of the pickup truck's bed in place, the front end of the housing being disposed between the laterally opposed walls defining the bed and with the upper edge of the triangular portion 26 of the upper wall 16 of the housing contacting a lower surface of the cover C, thus providing a seal therebetween (this positioning is shown in FIG. 1). This seal prevents snow, rain, wind or the like from blowing within the enclosed area. Additionally, any water will flow downwardly and outwardly due to the sloped contour of this portion. As noted above, the enclosure may be adjusted to have a substantially triangular configuration, rather than rectangular, which will also allow water to flow downwardly and outwardly. It should be understood that the resilient member 144 may be removable and may be retained on member 142 by any suitable type of fastener, such as hook and loop fasteners or the like.

Any suitable type of releasable fastener may be used to secure the open front end 20 and the open lower end of the housing to the open rear end of the vehicle. For example, at least one pair of hook members 28 may be attached to laterally opposed ends of the at least one elastic cord 36. At least one pair of brackets 30 are mounted within the rear end of the vehicle for releasably engaging the at least one pair of hook members 28 and releasably securing the housing to the rear end of the vehicle. It should be understood that brackets 30 may be mounted in any desired location with respect to the open tailgate. Although shown in FIG. 2 as being adjacent the open end of the truck bed, brackets 30 may be positioned approximately ten inches in from the open end, for example. In the embodiment of FIG. 7, hook members 128 are similarly provided. It should be noted that front sets of hook members 128 are preferably arrayed along the front, vertical edges of housing 132, as shown. This arrangement (with corresponding brackets in the vehicle) is particularly useful for connection to the interior of a sports utility vehicle (SUV) or the like.

Figure 13A:
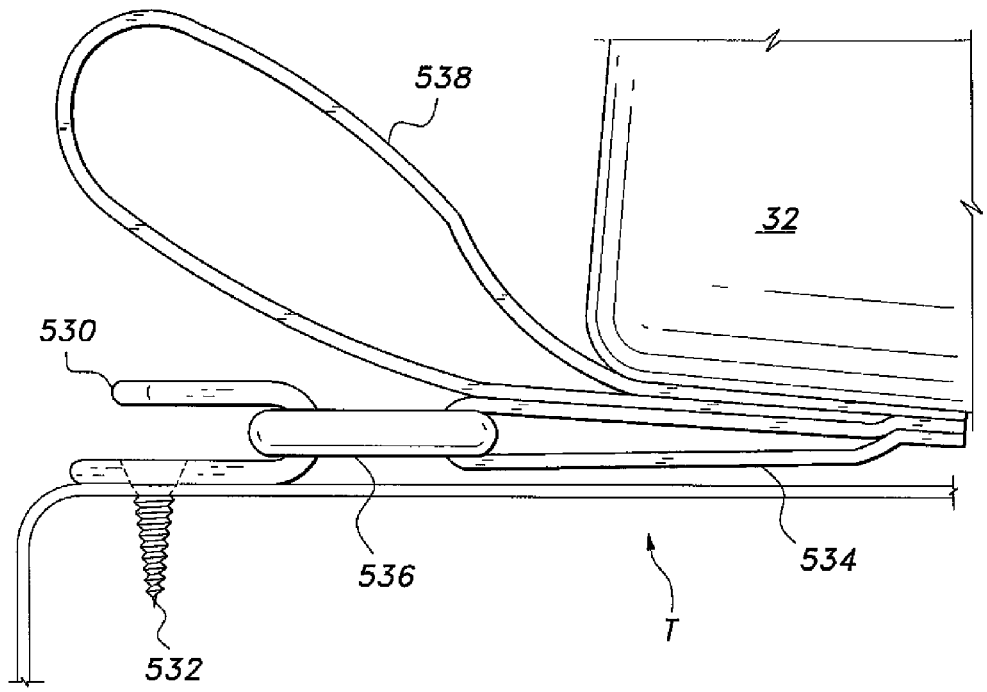
FIG. 13A is a partial, side view of the removable enclosure for the rear of a vehicle according to the present invention, showing an alternative fastener therefor.
Figure 13B:
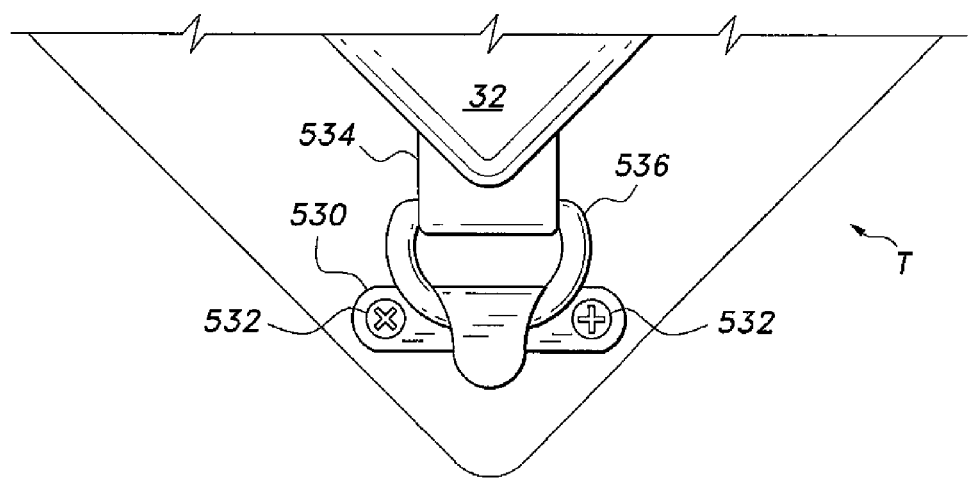
FIG. 13B is a partial top view of the alternative fastener of FIG. 13A.

FIGS. 13A and 13B illustrate an alternative mounting structure to the brackets 30 of FIG. 2. As shown, substantially U-shaped brackets 530 may be mounted directly on the open tailgate T via screws 532 or other fasteners. D-rings 536 are attached to the exterior of the housing 32 by straps 534 or the like. The D-rings 536 are releasably hooked to the U-shaped brackets 530. In FIG. 13A, a looped handle 538 is shown extending from the exterior of the housing 32 adjacent the corresponding strap 534, allowing the user to easily disengage the D-ring 536 from the bracket 530. The looped handle 538 has been removed in FIG. 13B for purposes of clarity.

Figure 4:
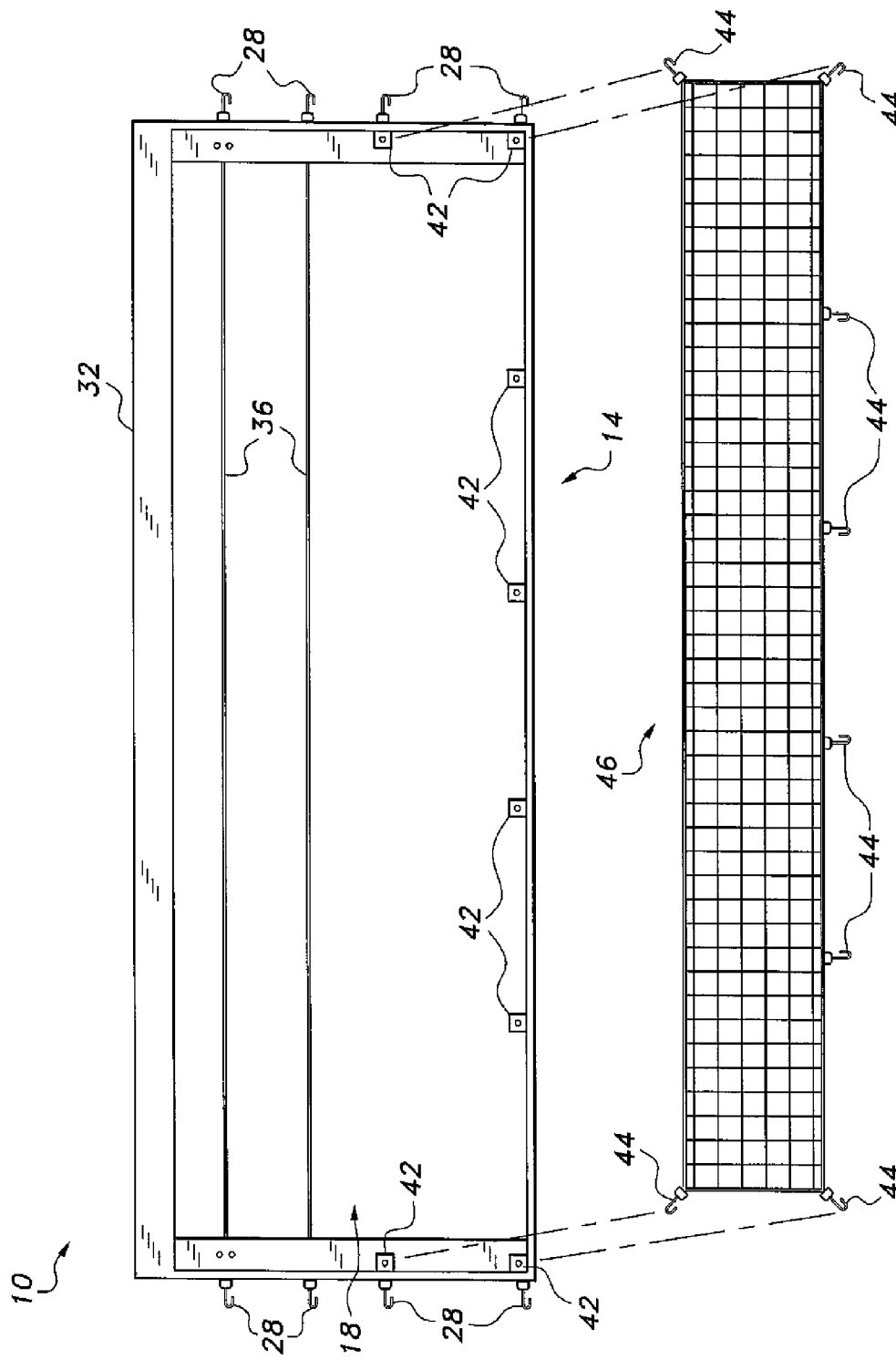
FIG. 4 is a front view of an alternative embodiment of a removable enclosure for the rear of a vehicle.
Figure 5:
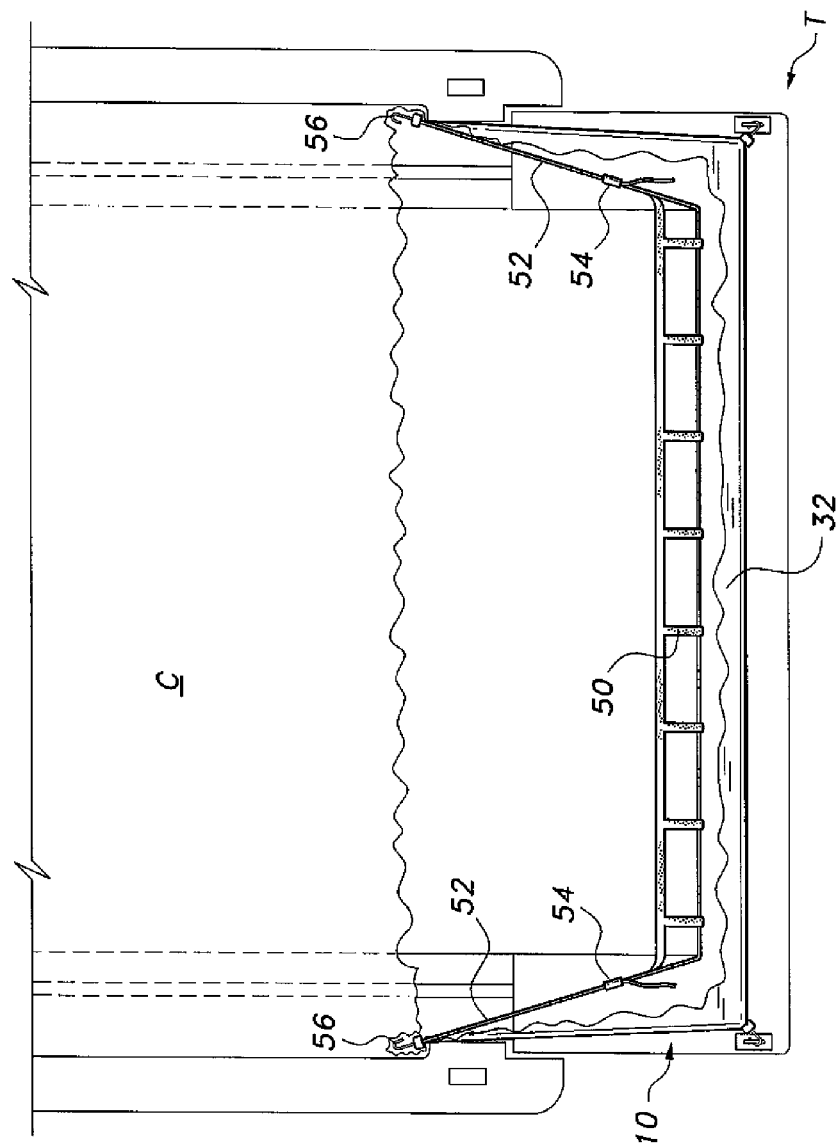
FIG. 5 is a top view of another alternative embodiment of a removable enclosure for the rear of a vehicle.
Figure 15:
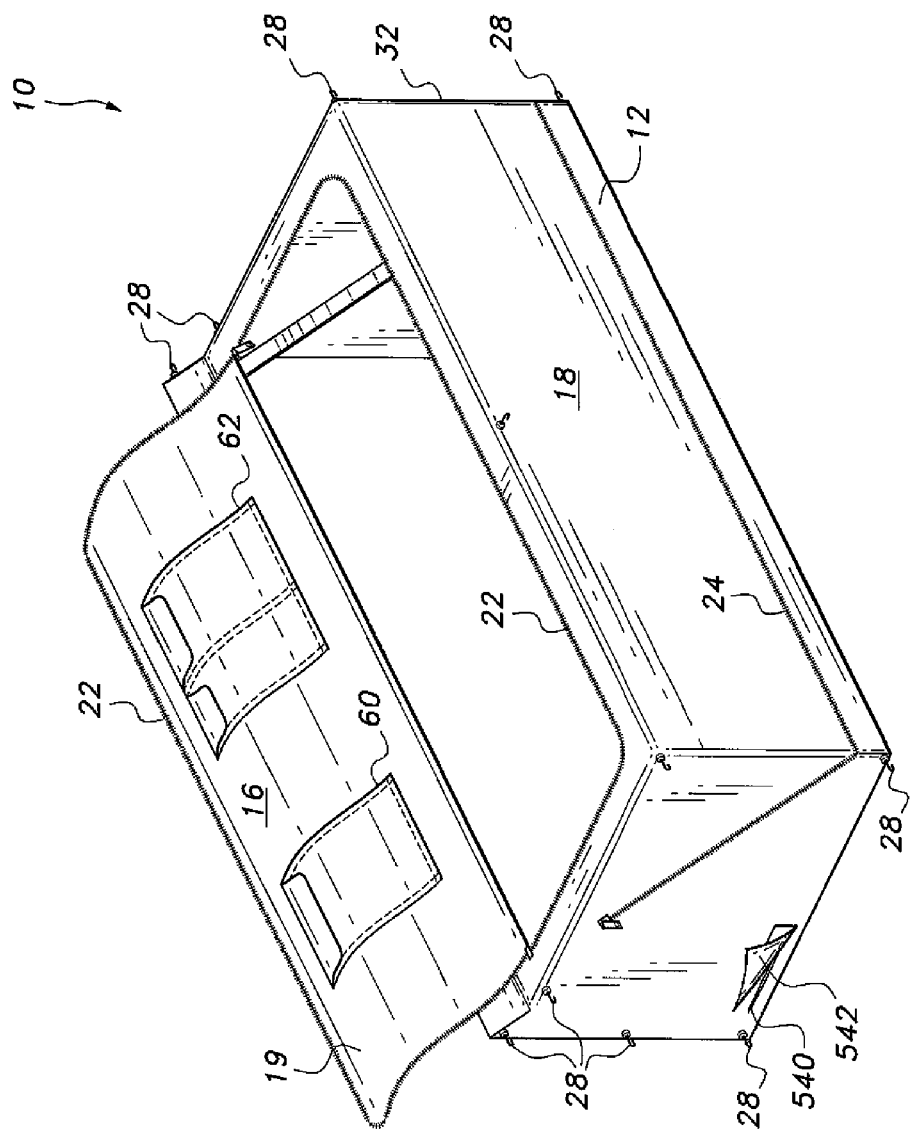
FIG. 15 is a perspective view of the removable enclosure of FIG. 6, showing an optional slot for facilitating attachment of the enclosure to the vehicle.

Additional elements and accessories may be provided for use with the enclosure 10. In the alternative embodiment of FIG. 4, a plurality of tabs 42 have been secured to the front end of the housing. A laterally extending retainer member 46 may be releasably attached to the open front end 20 to at least partially cover the front end 20. Preferably, retainer member 46 fully covers the front end 20, extending fully from top to bottom of the front end 20, allowing retainer member 46 to be effectively used with a pet carrier for retaining pets within the enclosure. The retainer member 46 is preferably provided with a plurality of hook members 44, as shown, for engaging the tabs 42. It should be understood that any suitable type of releasable fasteners may be utilized. As an alternative, hook members 44 may be used in combination with brackets 30 of FIG. 2, rather than tabs 42. Similarly, a cargo retainer 50 may be added, as shown in FIG. 5, the cargo retainer 50 being formed from mesh or the like and having a pair of laterally extending straps 52. Each strap 52 terminates in a hook member 56 for engaging a bracket mounted within the vehicle. Additional strap binders 54, buckles or the like may also be utilized. Preferably, when using retainer 50, a slot 540 is formed through the housing 32, as shown in FIG. 15. The retainer 50, in use, passes through this slot for attachment to the truck's cargo eye. A flap 542 may be provided for covering the slot 540, and may be held in place via hook and loop fasteners or any other suitable type of fastener.

Figure 8:
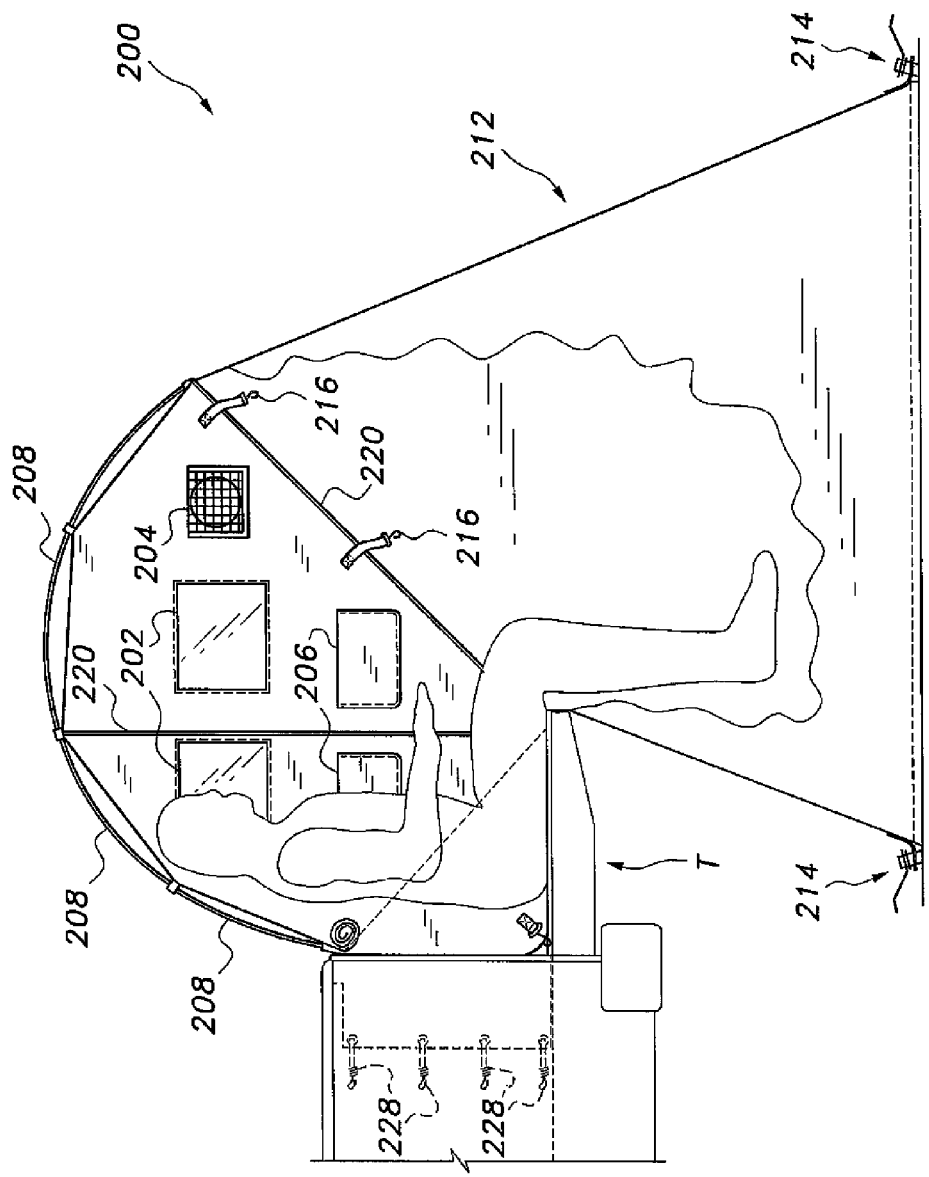
FIG. 8 is a side view of yet another alternative embodiment of a removable enclosure for the rear of a vehicle according to the present invention, shown broken away to show details thereof.
Figure 9:
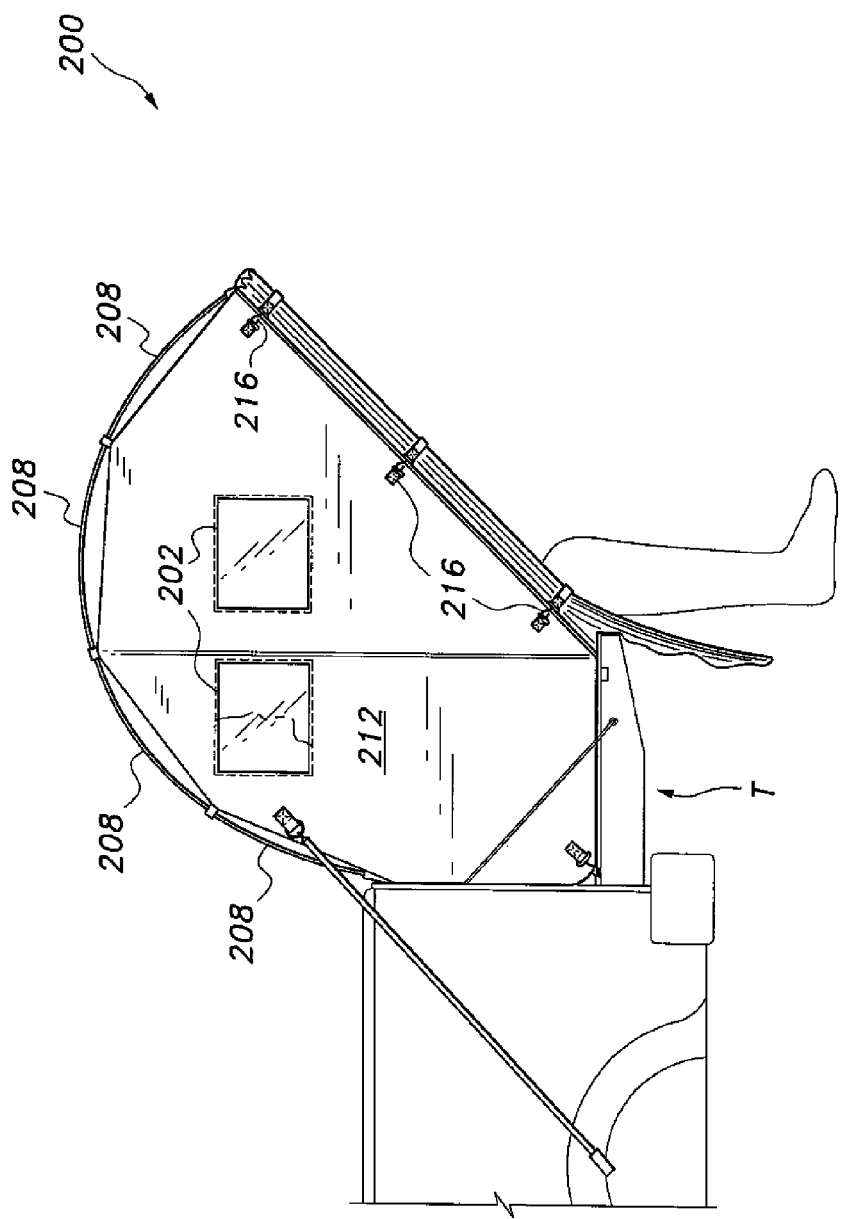
FIG. 9 is a side view of the removable enclosure of FIG. 8, shown configured as a partial shelter.

In the embodiment of FIGS. 8 and 9, the substantially rectangular enclosures 10 and 100 have been replaced by a tent enclosure 200 adapted for housing a person therein. The housing 212 is sized and configured substantially similar to a conventional one-person tent. A front edge of the housing 212 has a plurality of hook members 228 mounted thereon (arrayed similarly to those shown in the embodiment of FIG. 7) for releasable engagement with corresponding brackets mounted within the vehicle. One or more external frame supports 208 and an internal frame support 220, which is pivotally secured to the rear end of the vehicle (tailgate T in the example of FIGS. 8 and 9), provide a framework for the structure. The supports 208, 220 may be fiberglass rods or the like.

Figure 11:
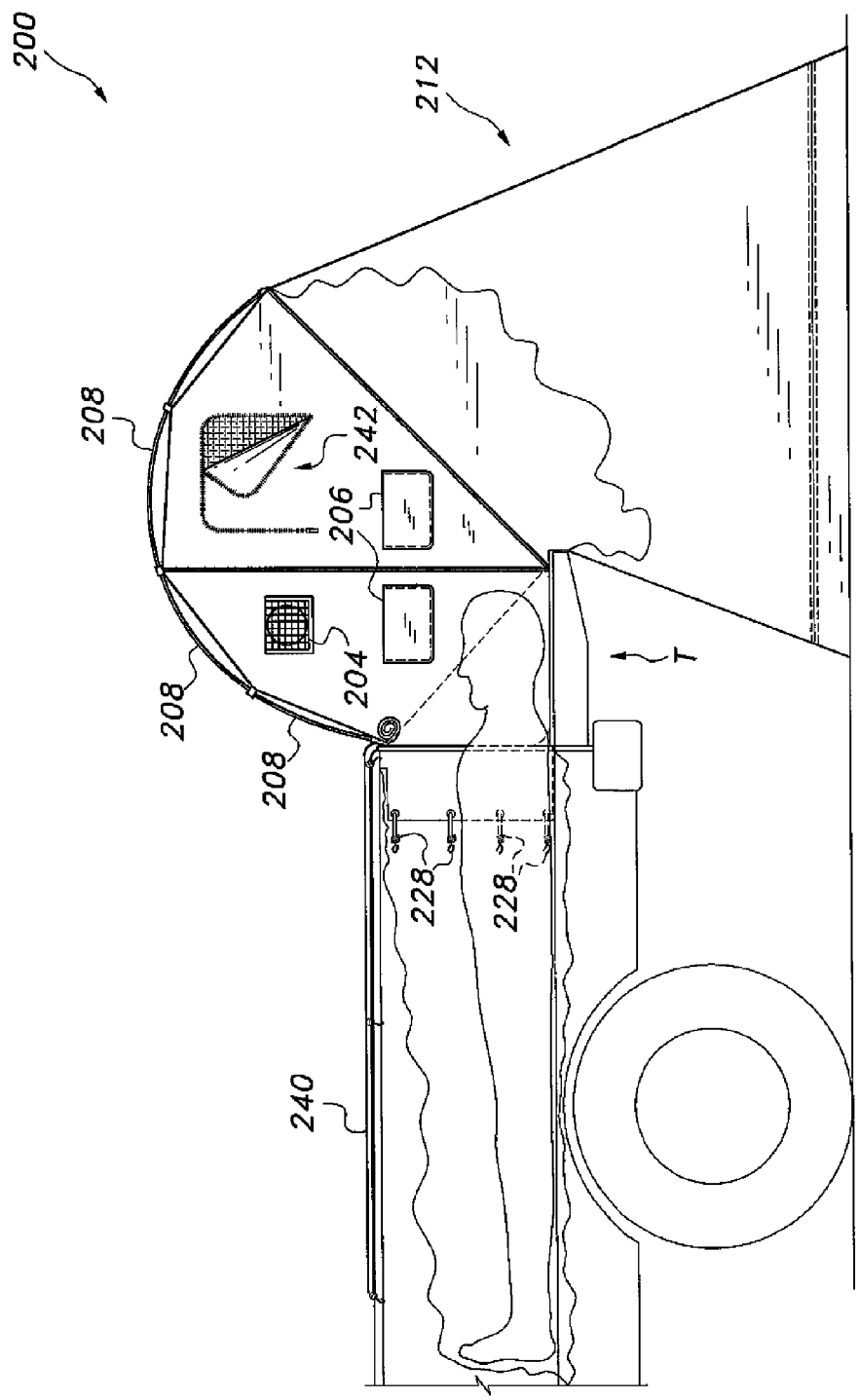
FIG. 11 is a side view of yet another alternative embodiment of a removable enclosure for the rear of a vehicle according to the present invention, shown broken away to show details thereof.

Tent pegs 214 (or any other type of stake, such as ice anchors, are provided for securing a lower end of the housing 212 to the ground. Additionally, a storage pocket 206, a window 202 flap or the like, and a vent 204 may be provided. FIG. 9 illustrates the lower portion of housing 212 raised and connected to the diagonal support 220, with the lower end of housing 212 being held in place by straps 216. It should be understood that any suitable type of releasable fastener may be utilized. FIG. 11 illustrates tent enclosure 200 with an additional extending portion 240, formed from reflective material, so that the user may lie in the orientation shown with thermal solar radiation being reflected away. Preferably, the reflective portion 240 is removable, allowing the reflective covering to be used in any desired location, or with any desired configuration, such as being added to the pet enclosure of FIG. 12. FIG. 11 illustrates alternative positioning of the pocket 204 and the vent 204. An additional flap 242 has also been added.

Figure 16:
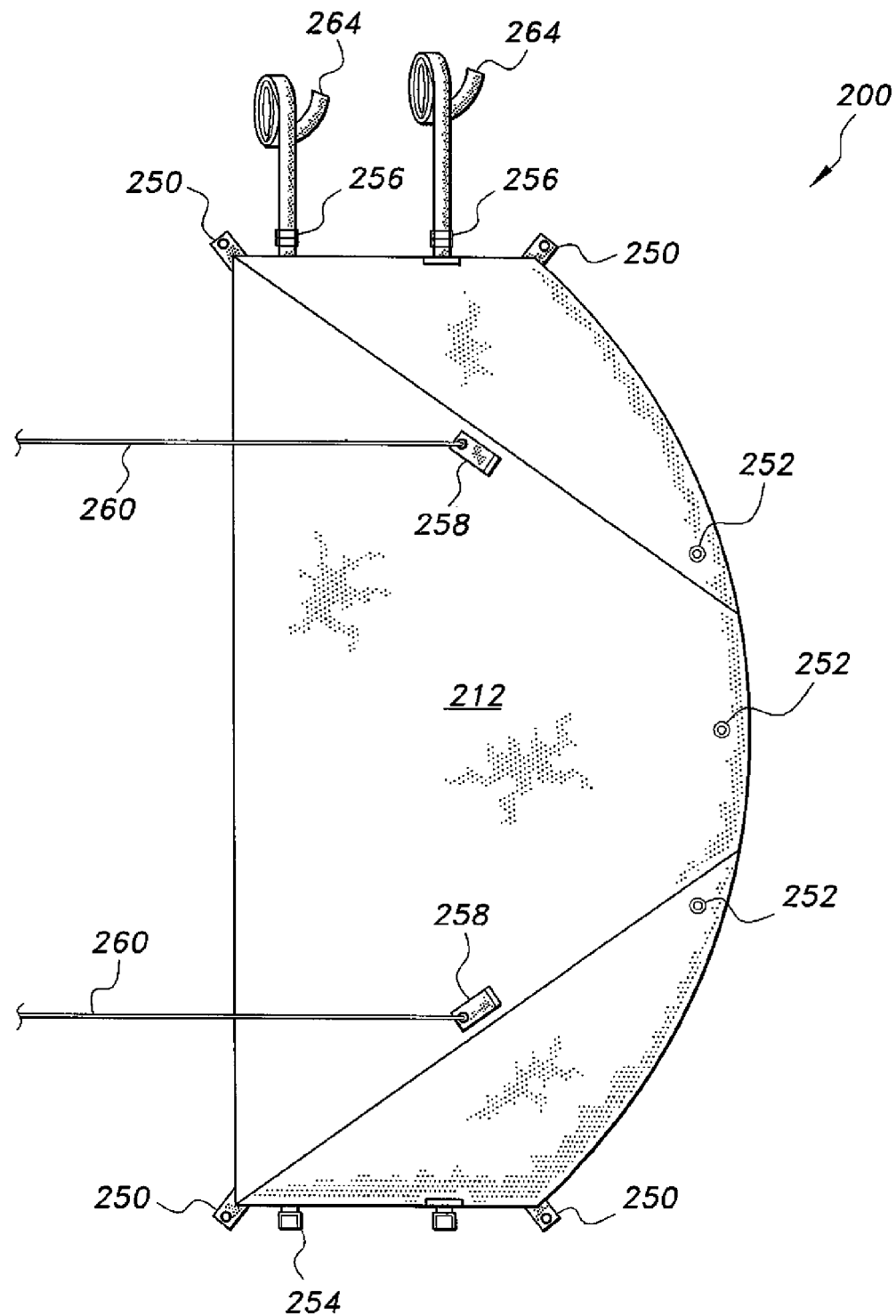
FIG. 16 is a top view of the removable enclosure of FIG. 8 illustrating an alternative set of retainers.

FIG. 16 illustrates the tent enclosure 200 with an alternative set of connector elements. In FIG. 16, a peg retainer 250 is secured to each corner of the housing 212 for receiving tent pegs 214 or other forms of stakes or pins. Each peg retainer 250 is preferably formed as a truncated strap or the like, having an aperture formed therethrough for receiving a peg 214. Additional buckles 254, 256 and straps 264 may further be provided for securing the housing 212 to the ground. In FIG. 16, the straps 264 are only shown as being attached to buckles 256, although it should be understood that this is illustrated for purposes of clarity only, and that buckles 254 also receive similar straps. In FIG. 16, the buckles 254 are preferably fixed to one side of the housing 212, and buckles 256 are releasably attached to the other side of housing 212. This allows for easy detachment of one set of buckles and straps when not needed, such as when the housing 212 is used at a beach.

Additionally, further retainers or holders 258 are provided on the upper surface of housing 212, allowing for connection to additional straps 260, which may be used in windy conditions or the like. It should be understood that with the variety of attachments provided, the tent enclosure 200 is not limited solely to connection to the tailgate of a truck, as illustrated. The enclosure 200 may instead be used in combination with for example, picnic tables, general tables or other support surfaces, scaffolding, or for general camping or shelter in the wilderness, at the beach, etc. For arrangements in which the enclosure 200 is used with a relatively lightweight support, such as a picnic table, for example, an adjustable quick release fastener is preferably on the forward straps. Thus, enclosure 200 will be held to the table by the rear straps if a wind gust lifts the enclosure 200 off the tabletop, but, due to the quick release, the table will not be flipped over or otherwise repositioned due to the wind.

Figure 17:
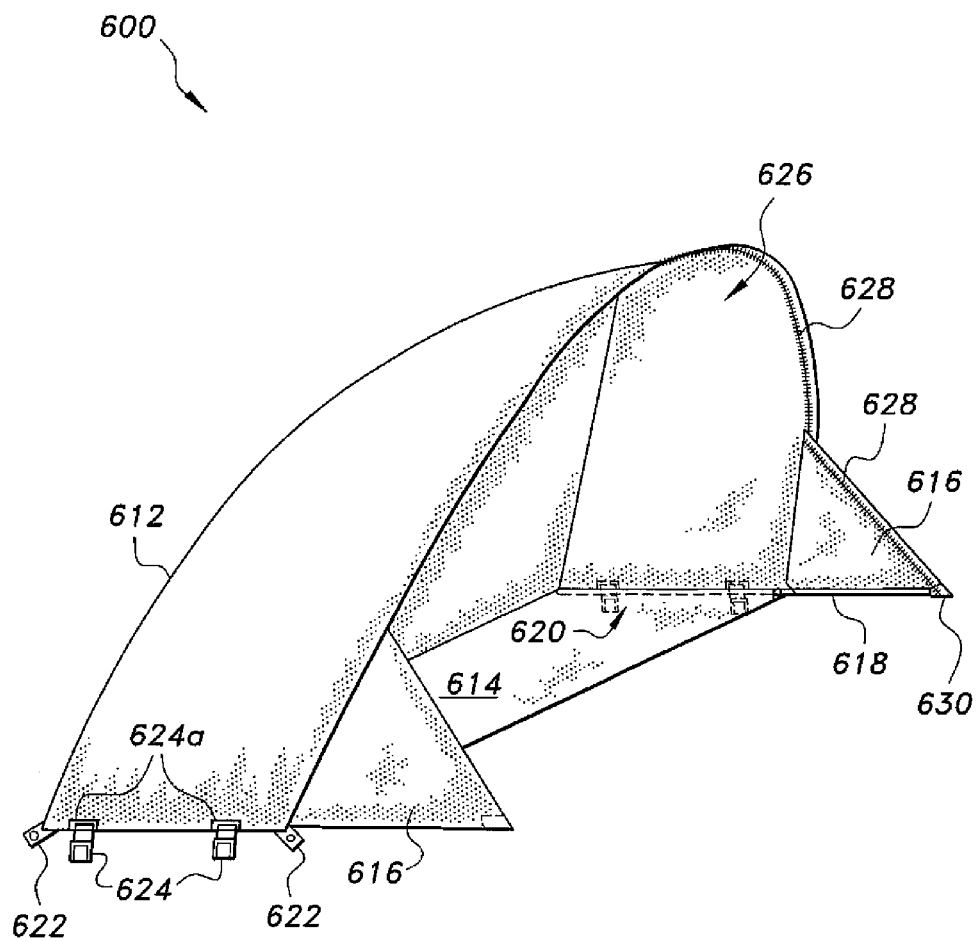
FIG. 17 is a perspective view of an alternative embodiment of a removable enclosure for the rear of a vehicle according to the present invention.

FIG. 17 illustrates an enclosure 600 adapted for attachment to a picnic table or the like, rather than to a truck's tailgate. The enclosure 600 includes a waterproof housing 612, as described in the previous embodiments, having an open front end 626 and a floor 614, which is adapted for mounting on the upper surface of the picnic table or other support surface. The waterproof housing 612 is preferably configured as a substantial half dome where the curved or rounded profile provides minimal wind resistance so as to minimize undesirable deformation or fluttering of the housing 612, especially in windy and otherwise adverse weather conditions. The housing 612 is preferably elongated to provide as much occupancy space as possible. Consequently, the floor 614 occupies a substantially rectangular floor space, when viewed from the top, with a pair of opposite long sides and a pair of opposite short sides. The open front end 626 preferably extends along one of the long sides and curved in shape so as to maximize the area of the opening to facilitate ease of ingress and egress into and out of the housing 612. The curved or semicircular shape of the open front end 626 conforms to the substantial half dome shape of the housing 612 and serves as one of several sections that define the overall shape of the housing 612.

A pair of side flaps 616 are provided, also formed from the waterproof material of housing 612. Each side flap 616 is releasably extendable through insertion of a stiffening rod 618 within a sleeve 620 formed along the short side edges of the floor 614 and a retainer portion 630 of each flap 616. When the stiffening rod 618 is removed, the flaps 616 may be secured against the open front end 626 via zippers 628 or the like.

Figure 19:
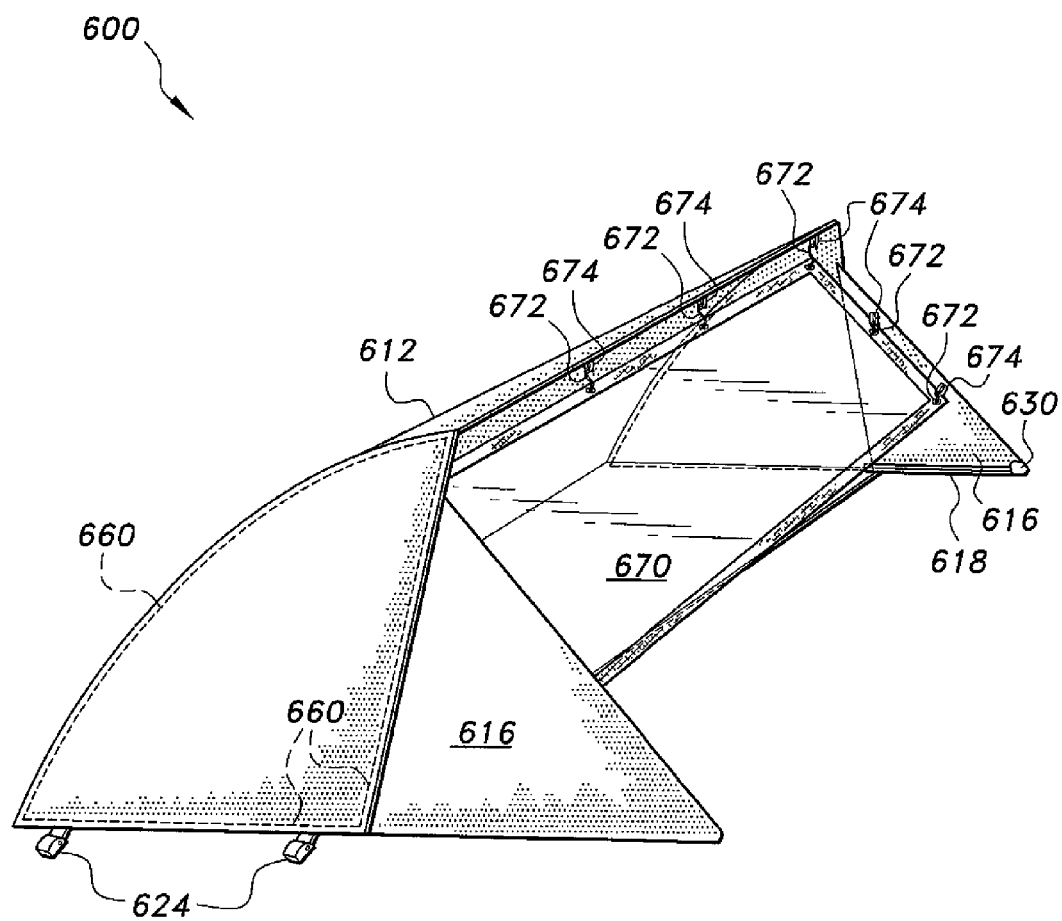
FIG. 19 is a perspective view of the removable enclosure of FIG. 17, shown with an alternative cover panel.

Each corner preferably has a retainer 622 mounted thereto, similar to the peg retainers 250 of FIG. 16, and buckles 624 for releasable and adjustable attachment of straps for securing the housing 612 to the picnic table or other support surface. The housing 612 can include cutouts 624a and the like substantially near or on the short sides of the floor 614 with the cutouts 624a in communication with the respective sleeve 620. The cutouts 624a facilitate easy detachable and interchangeable mounting of any of the retainers, fasteners, straps, hooks, and variations thereof. The stiffening rod 618 serves as an anchor for mounting of the abovementioned components. As in the previous embodiments, the enclosure 600 may include multiple stiffening or support rods 660 (as shown in FIG. 19) for maintaining the housing 612 in the deployed shape shown in the drawings. For storage, the stiffening or support rods 660 may be removed and stored in pockets associated with the housing 612, and the housing 612 may be folded for easy transport and storage thereof.

Figure 18:
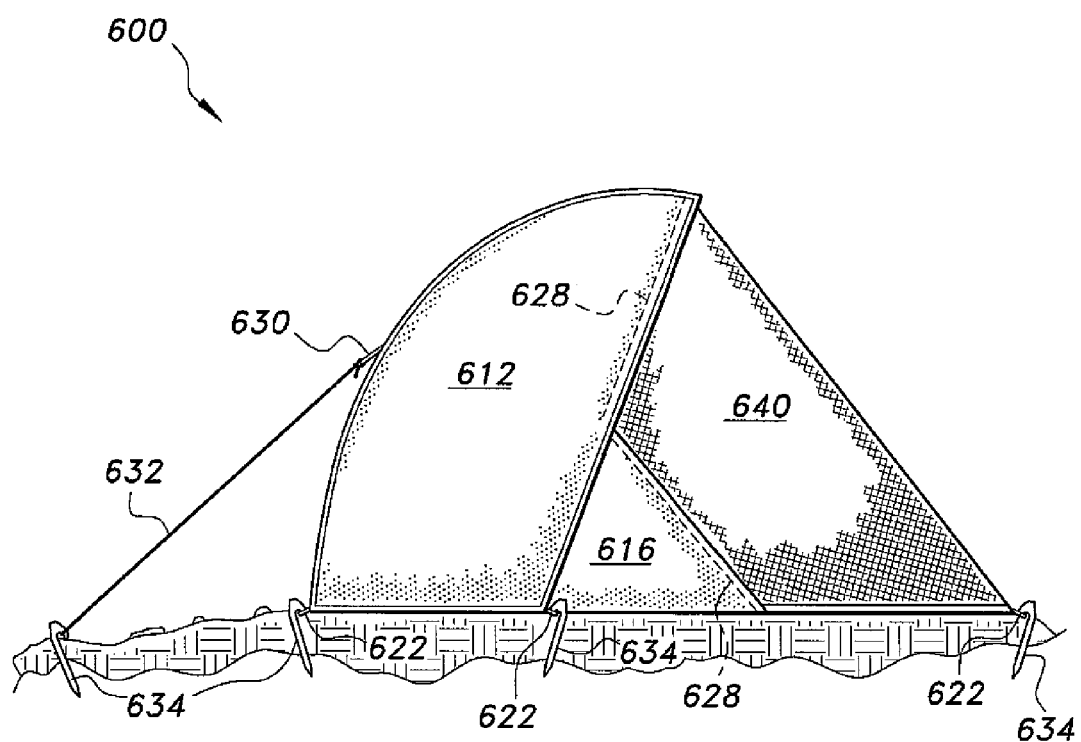
FIG. 18 is an environmental, side view of an alternative configuration of the removable enclosure of FIG. 17.

FIG. 18 illustrates the enclosure 600 being used as a conventional enclosure at the beach, although it should be understood that the enclosure 600 may be used in any desired environment. The buckles 624 may be removable, as shown, since they are not necessary for such an environment. Peg retainers 622 are shown receiving conventional tent pegs 634 or the like, and an additional buckle or retainer 630 may be secured to the housing 612, as shown. The additional buckle or retainer 630 receives one end of a support strap 632, the other end being fixed to the ground by a tent peg 634.

An additional screen 640, which may be formed from screen mesh or the like, may be fixed to the open front end 626, either through connection with zippers 628 or by any other suitable releasable fasteners. The front lower end of the screen 640 preferably also has a peg retainer 622 mounted thereon for receiving another tent peg 634.

FIG. 19 illustrates an additional clear panel 670 partially covering the open front end 626. The clear panel 670 is similar to a clear plastic "sneeze guard", conventionally associated with salad bars and the like. It should be understood that the enclosure 600 may be manufactured in a wide variety of sizes, and a smaller size may be used to house food items, for example, rather than people. The clear panel 670 may be used with such a configuration. The clear panel 670 preferably has a plurality of hooks 672 or the like for engaging openings 674 formed through the housing 612 and the flaps 616. Additionally, the peg retainers 622 may be removable, as shown in FIG. 19, depending upon the particular type of support surface with which the enclosure 600 is being used.

Figure 20:
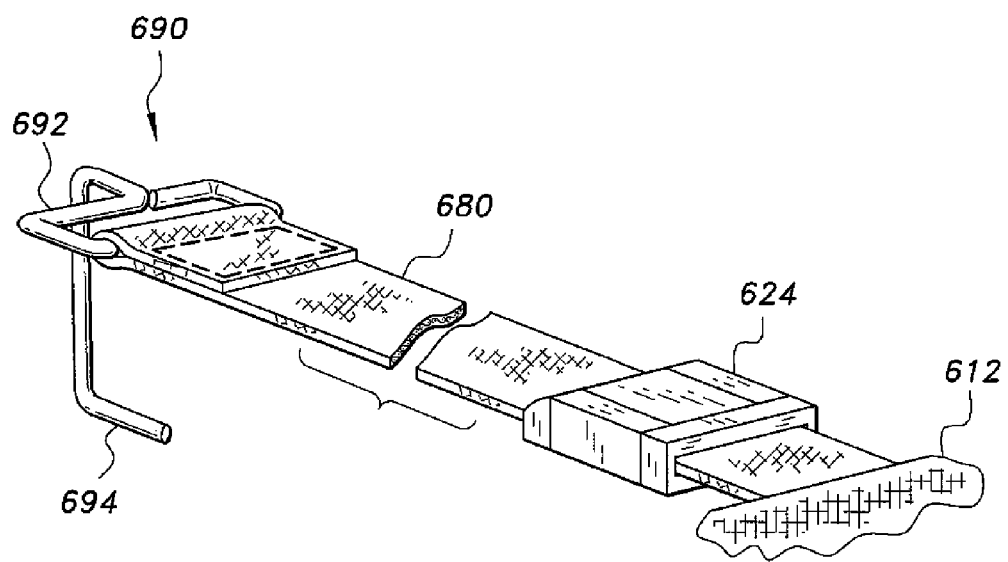
FIG. 20 is a perspective view of a connector for use with the removable enclosure of FIG. 16.
Figure 24:
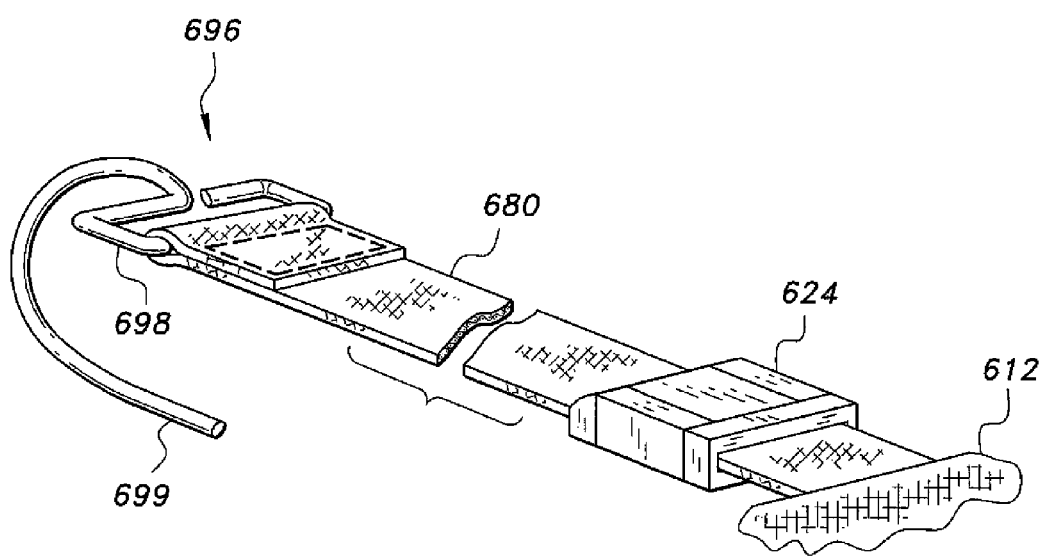
FIG. 24 is a perspective view of an alternative connector for use with the removable enclosure of FIG. 16.

It should be understood that any suitable type of retainers may be used, depending upon the particular environment or support surface. FIG. 20 illustrates a retainer 690 adapted for connection to a picnic table or the like. A strap 680 is fixed at one end to a buckle 624, which is mounted on the lower portion of the housing 611. The other end of the strap 680 is fixed to the retainer 690, which includes an upper portion 692 (for holding the strap 680) and a lower portion 694. The lower portion 694 is preferably L-shaped for hooking over the side edge of a conventional tabletop. It should be understood that the flaps 616 and the panel 670 may be applied to the previous embodiments, such as that shown in FIGS. 8 and 9. FIG. 24 illustrates a similar retainer 696 having an upper portion 698 and a lower portion 699, but in this case, the lower portion 699 is a substantially C-shaped.

Figure 22:
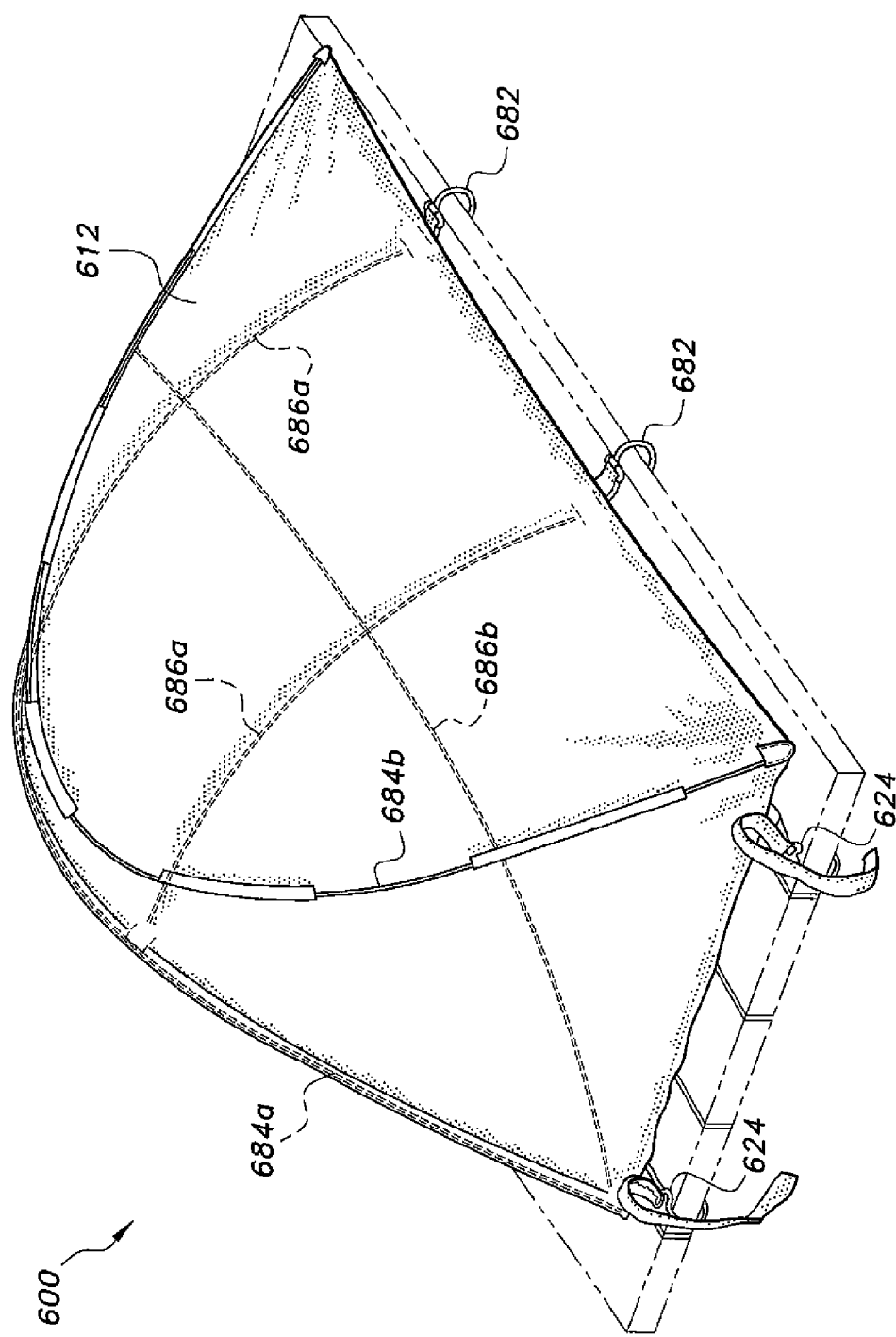
FIG. 22 is a rear perspective view of the removable enclosure of FIG. 16, shown with optional external supports.

FIG. 22 illustrates the enclosure 600 equipped with additional support elements. In FIG. 22, external support rods 684a and 684b are provided (similar to those discussed above with regard to FIG. 9), as well as internal stiffening or support rods 686a and 686b, as discussed above. The external support rods 684a and 684b, or first support rod 684a and second support rod 684b, define the general shape of the housing 612, and unlike most conventional dome-shaped tents or housings, the first and second support rods 684a, 684b do not cross each other in assembled form. The first support rod 684a defines and frames the open front end 626 while the second support rod 684b is spaced from the first support rod 684a and frames an arch that preserves the desired general half dome shape of the housing 612. The internal stiffening rods 686a, 686b further preserves the half dome shape and includes a pair of vertical first stiffening rods 686a and a substantially horizontal second stiffening rod 686b. The first stiffening rods 686a frame the general curve of the housing 612 in the vertical direction while the second stiffening rod 686b extends from near one corner of the open front end 626 to near the other opposite corner of the open front end 626 in the general horizontal direction of the housing 612 in order to frame the general curve of the housing 612 in the horizontal direction. The second stiffening rod 686b spans across the first stiffening rods 686a and applies a constant force against the first stiffening rods to ensure the first stiffening rods 686a remain bent or arched. As shown in FIG. 22, this configuration places the second stiffening rod 686b at an angular disposition with respect to the surface upon which the enclosure 600 is mounted.

In addition to buckles 624, as described above, FIG. 22 shows additional hooks 682 or the like, which may be provided for holding the rear of housing 612 to the tabletop. It should be noted that the stiffening rod 618 of FIG. 17 not only maintains the overall shape of the base of the enclosure 600, but also provides a stable support for the hook-type connectors, particularly when the hook-type connectors must be used centrally (i.e., when they are positioned away from the corners) for connection to tabletops having rounded corners, for example. Additionally, it should be understood that when switching from a strap-type connector assembly to a hook-type connector assembly, the stiffening rod 618 may be removed from the rear and used solely to support the flap portion 616. Further, it should be understood that any suitable type of rod or support may be utilized. For example, an extensible or multi-part rod may be used. In the latter example, a removable stiffening rod could be used to support only the side edge of the main enclosure housing, with a separate, detachable rod being used to support the corresponding flap 616. In such an arrangement, the attachments could be releasably held to the side edges of the enclosure by interconnection with the main stiffening rod body; i.e., the fixed end of a connecting strap could be releasably held by the stiffening rod 618. When desired to change to, for example, a hook-type connector, the stiffening rod 618 could be removed, the connectors could be switched, and the stiffening rod 618 could be replaced.

Figure 23:
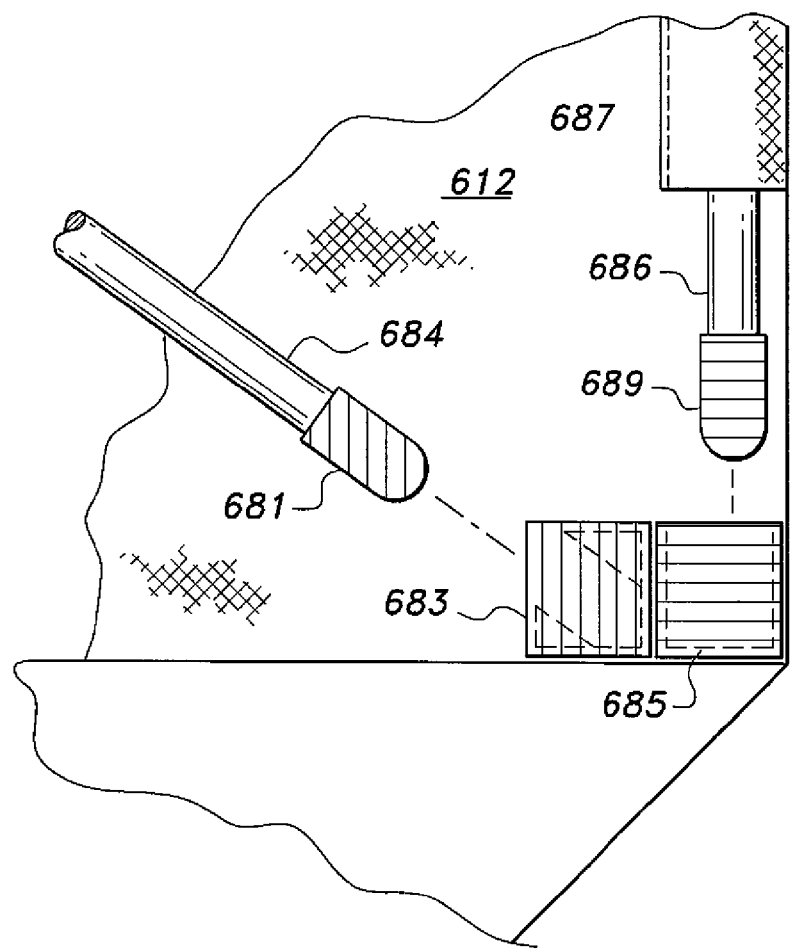
FIG. 23 illustrates insertion of support rods in the removable enclosure of FIG. 22.

FIG. 23 illustrates an internal stiffening rod 686 (removably contained within a sleeve 687 sewn to the interior of the housing 612, as described above) having an end cap 689, which is preferably manufactured in a first color or pattern. The external stiffening rod 684 also has an end cap 681, which is preferably manufactured in a second color or pattern, which is dissimilar to that of the first color or pattern. The end cap 681 is removably inserted into a pocket 683, which is sewn to the housing 612 and is formed in the second color or pattern. The end cap 689 is similarly removably inserted into a pocket 685, which is formed in the first color or pattern, allowing for easy set up by the user.

In preferred embodiments, the hooks 682 and the lower portion 699 as shown in FIGS. 22 and 24 are preferably rounded, curved, coiled, or substantially circular. In use, the curved shape of the hooks 682 and the lower portion 699 provides further functionality in addition to securing the corresponding portions of the housing 612. When the connected strap is pulled and tensions the hook 682 or the lower portion 699 due to wind or some other influence, the curved hook 682 or lower portion 699 counters that tension by providing a countervailing tension. The countervailing tension is applied by the resiliency or the natural spring constant of the curved hook such that the tension from the external influences pulls the curved hook at one end and causes the opposite end to pull back in the opposite direction. Such a reaction tends to force the corresponding hooked portion to dig into the underside of the table or platform. Moreover, the curved or rounded shape of the hooks 682 and the lower portion 699 facilitates secure mounting of the enclosure 600 to a wider range of table or platform thicknesses, i.e. any thickness that can fit between the ends of the curved hook. In contrast, a squared hook will provide similar secure engagement and mounting for thickness that range about the same or slightly less than the thickness of the space between the ends of the squared hook. Any thickness substantially less than the spacing between the ends of the squared hook will result in a loose fit. Thus, a curved or rounded hook is more universal in application compared to the squared hook.

FIG. 12 illustrates an alternative enclosure 400, similar to that shown in FIGS. 8, 9 and 11, but with a housing 412 being sized and configured for use by dogs or other pets. An overhanging portion 404 has been added, with the rear portion 406 of the enclosure being open. A ramp 408 is provided for pivotal connection to the open tailgate T, as shown, allowing the pet to easily enter and exit the open rear end 406. Vents 410, 414 may be formed through sidewalls 402, as shown, and hook members 428 engage brackets mounted within the vehicle, in a manner similar to those described with relation to previous embodiments. As noted above, retainer member 46 may be used to form the forward end of the pet enclosure in this embodiment.

Figure 10:
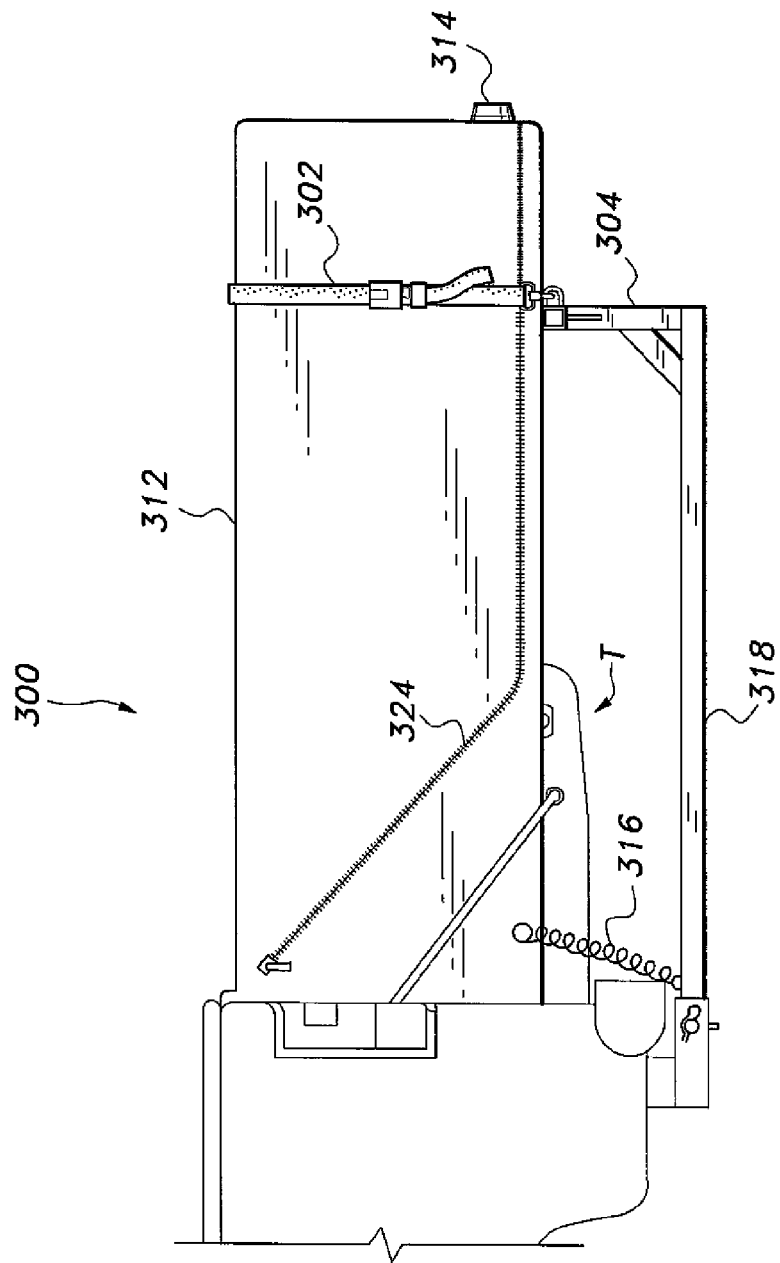
FIG. 10 is a side view of another alternative embodiment of a removable enclosure for the rear of a vehicle according to the present invention.

In the alternative embodiment of FIG. 10, the enclosure 300 is similar to the enclosure 10, but with a longer housing 312. As shown, the housing 312 is adapted for covering long loads, such as lumber or the like. Since housing 312 extends beyond tailgate T, a support 318 is provided. One end of the support 318 is attached to the rear end of the vehicle (beneath the truck bed, e.g., to a tow hitch), and the other end has a vertical support 304 mounted thereon for supporting the rear end of housing 312. A slit 324 may be formed in housing 312, similar to that described above with reference to enclosure 10, and a set of taillights 314 may be secured to the rear face of the housing 312. Power and control of taillights 314 is accomplished in a manner similar to that of a conventional extension trailer, the power and control signals being provided through a cable 316.

Figure 21:
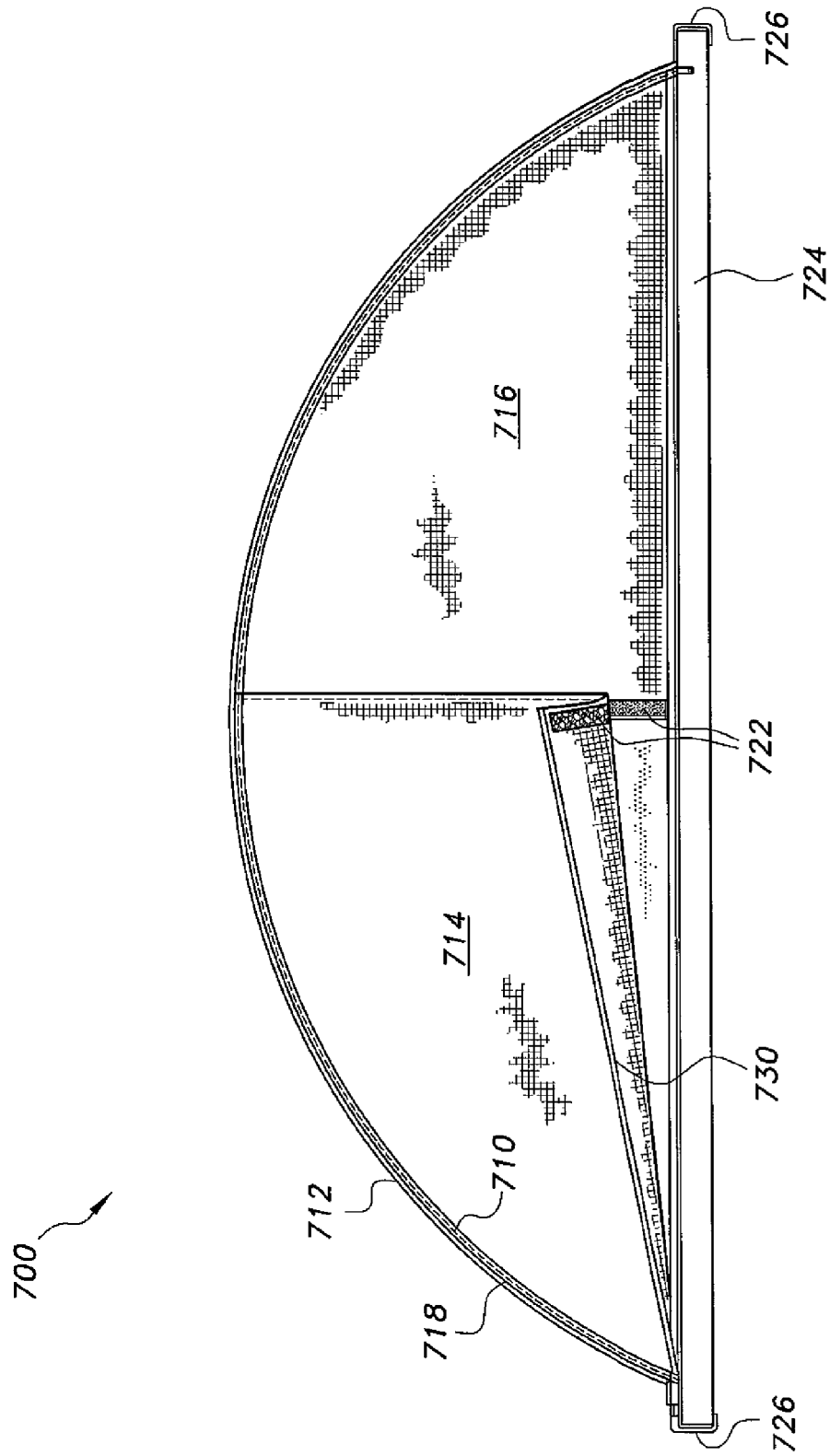
FIG. 21 is a front view of another alternative embodiment of a removable enclosure for the rear of a vehicle according to the present invention.

FIG. 21 illustrates an enclosure 700 having a housing 712 formed from screen mesh or the like, provided as protection from insects when the enclosure 700 is used for a picnic or the like. The housing 712 is adapted for mounting on a conventional tabletop 724, such as that associated with a picnic table, and has an overall configuration similar to that of a Quonset hut. The front end may be covered by a pair of mesh flaps 714, 716, which may be retained to the open front end of the housing 712 by zippers 710 or the like. The flaps 714, 716 may be held together by any suitable releasable fastener, such as hook and loop fasteners 722 or the like. The enclosure 700 may use stiffening rods 730, as described above with regard to the previous embodiments, and may be fixed at the corners to the tabletop 724 by C-shaped clamps or retainers 726, as shown, or the like.

It is to be understood that the present invention is not limited to the embodiments described above, but encompasses any and all embodiments within the scope of the following claims.

I claim:

1. A removable enclosure, comprising:
a housing having at least a lower wall and an upper wall defining an open front end;
an internal frame removably disposed within and supporting the housing, at least one internal pocket disposed along the lower wall of the interior surface of the housing, the internal frame having at least one elongated stiffening rod removably received within the at least one pocket fixed to the interior surface of the housing;
an external frame removably disposed on an external surface of said housing, at least one external pocket disposed along the lower wall of the exterior surface of the housing, the external frame having a first support rod extending along an end of the upper wall and a second support rod spaced from the first support rod along the upper wall, wherein a terminal end of the first support rod is removably received within the at least one external pocket;
a pair of side flaps secured to respective side edges of the open front end of the housing, each of the side flaps having a lower wall and a retainer, each of the side flaps further including a sleeve disposed along the lower wall;
a pair of lower sleeves secured to the housing adjacent the lower wall and each being aligned with a respective flap sleeve;
at least one stiffening rod including a front end and a rear end, the rear end being removably received within a lower sleeve of the housing and the front end being removably received within a sleeve of a flap and supported by the retainer of the flap;
and means for releasably securing the lower wall of the housing to a support surface, the means for releasably securing the lower wall of the housing to the support surface having a plurality of straps disposed along at least three sides of the lower wall, each of the straps having at least one rounded hook for hooking around and under the support surface.

2. The removable enclosure according to claim 1, wherein the housing comprises a substantially half dome shape, the lower wall being a substantially elongated rectangular wall having a pair of spaced, opposing long sides and a pair of spaced, opposing short sides, the open front end extending along one of the long sides.

3. The removable enclosure according to claim 2, wherein the external frame comprises:
said first support rod arching between the one of the long sides and defining a substantially semi-circular arch for the open front end; and
a second support rod spaced from the first support rod along the upper wall, the second support rod extending between the first support rod and the other of the long sides, the second support rod forming an arch to frame a general dome shape for a rear section of the housing.

4. The removable enclosure according to claim 3, wherein the internal frame comprises:
- a pair of spaced first internal stiffening rods, each first internal stiffening rod extending between the first support rod and the other of the long sides, each first internal stiffening rod forming an arch in a vertical direction; and
- at least one second internal stiffening rod extending between the short sides of the lower wall, the second internal stiffening rod forming an arch in a horizontal direction, the arch of the second internal stiffening rod spanning across the pair of first internal stiffening rods to reinforce curvature of the general dome shape.

5. The removable enclosure according to claim 1, comprising:
- opposed ends of the at least one elongated internal stiffening rod having a first color, the at least one pocket along the lower wall being formed in the first color, and
- opposed ends of the first support rod having a second color dissimilar from the first color, the at least one pocket fixed to the exterior surface of the housing being formed in the second color.

6. The removable enclosure according to claim 1, further comprising means for releasably securing upper edges of the pair of side flaps to the open front end of the housing.

7. The removable enclosure according to claim 6, wherein the means for releasably securing the upper edges of the pair of side flaps to the open front end of the housing comprises a pair of zippers.

8. The removable enclosure according to claim 1, wherein the means for releasably securing the lower wall of the housing to the support surface further comprises a plurality of peg retainers secured to the housing for receiving a plurality of tent pegs.

9. The removable enclosure according to claim 1, further comprising at least one cutout formed along the respective lower sleeve, at least one of the plurality of straps being selectively anchored to the at least one stiffening rod removably inserted into the at least one sleeve.

10. The removable enclosure according to claim 1, further comprising at least one sidewall extending from respective side edges of the open front end.

\* \* \* \* \*